(12) United States Patent
Mantraratnam

(10) Patent No.: US 11,681,835 B2
(45) Date of Patent: Jun. 20, 2023

(54) RAPID POSITIONING DRAWING SYSTEM AND METHOD

(71) Applicant: Hexagon Technology Center GmbH, Heerbrugg (CH)

(72) Inventor: Venkata N. P. Mantraratnam, Madison, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 8 days.

(21) Appl. No.: 17/139,948

(22) Filed: Dec. 31, 2020

(65) Prior Publication Data

US 2022/0207198 A1  Jun. 30, 2022

(51) Int. Cl.
| | | |
|---|---|---|
| *G06F 30/12* | (2020.01) | |
| *G06F 30/20* | (2020.01) | |
| *G06F 3/04812* | (2022.01) | |
| *G06F 3/04815* | (2022.01) | |
| *G06F 3/04842* | (2022.01) | |
| *G06F 3/04845* | (2022.01) | |
| *G06F 111/16* | (2020.01) | |

(52) U.S. Cl.
CPC .......... *G06F 30/12* (2020.01); *G06F 3/04812* (2013.01); *G06F 3/04815* (2013.01); *G06F 3/04842* (2013.01); *G06F 3/04845* (2013.01); *G06F 30/20* (2020.01); *G06F 2111/16* (2020.01)

(58) Field of Classification Search
CPC ...... G06F 30/12; G06F 30/20; G06F 3/04845; G06F 3/04815; G06F 3/04812; G06F 3/04842; G06F 2111/16
See application file for complete search history.

(56) References Cited

U.S. PATENT DOCUMENTS

| | | | |
|---|---|---|---|
| 10,078,723 B1* | 9/2018 | Ghosh ................... | G06F 30/398 |
| 2002/0018061 A1 | 2/2002 | Gantt | |
| 2007/0088530 A1 | 4/2007 | Erignac et al. | |
| 2008/0225007 A1* | 9/2008 | Nakadaira ........... | G06F 3/03545 |
| | | | 345/173 |
| 2010/0138762 A1 | 6/2010 | Reghetti et al. | |
| 2011/0050686 A1* | 3/2011 | Nojima ............... | G06F 3/04815 |
| | | | 345/419 |
| 2011/0270586 A1 | 11/2011 | Diguet et al. | |
| 2012/0303343 A1* | 11/2012 | Sugiyama ............. | G06N 3/006 |
| | | | 703/6 |

(Continued)

OTHER PUBLICATIONS

International Search Report and Written Opinion for International Application No. PCT/US2021/065110, dated Apr. 25, 2022 (19 pages).

*Primary Examiner* — Michael Roswell
(74) *Attorney, Agent, or Firm* — Nutter McClennen & Fish LLP

(57) ABSTRACT

Methods and systems enhance the ability of a CAD system operator to add a new element to a CAD drawing, and/or edit a CAD drawing when moving a pre-existing element of the CAD drawing, by automatically generating and displaying over the CAD drawing a set of glyphs, where each glyph visually indicates to the CAD operator a point in the CAD drawing at which a new element, or a previously-drawn element being moved, will satisfy a minimum desired clearance distance from another element of the CAD drawing.

20 Claims, 13 Drawing Sheets

(56) References Cited

U.S. PATENT DOCUMENTS

| | | | |
|---|---|---|---|
| 2014/0207420 A1* | 7/2014 | Edwards | G06T 19/00 703/1 |
| 2015/0332508 A1* | 11/2015 | Jovanovic | G06F 3/0486 345/427 |
| 2018/0096528 A1* | 4/2018 | Needham | G06T 7/70 |
| 2021/0371105 A1* | 12/2021 | Rewerts | G06Q 10/0832 |

* cited by examiner

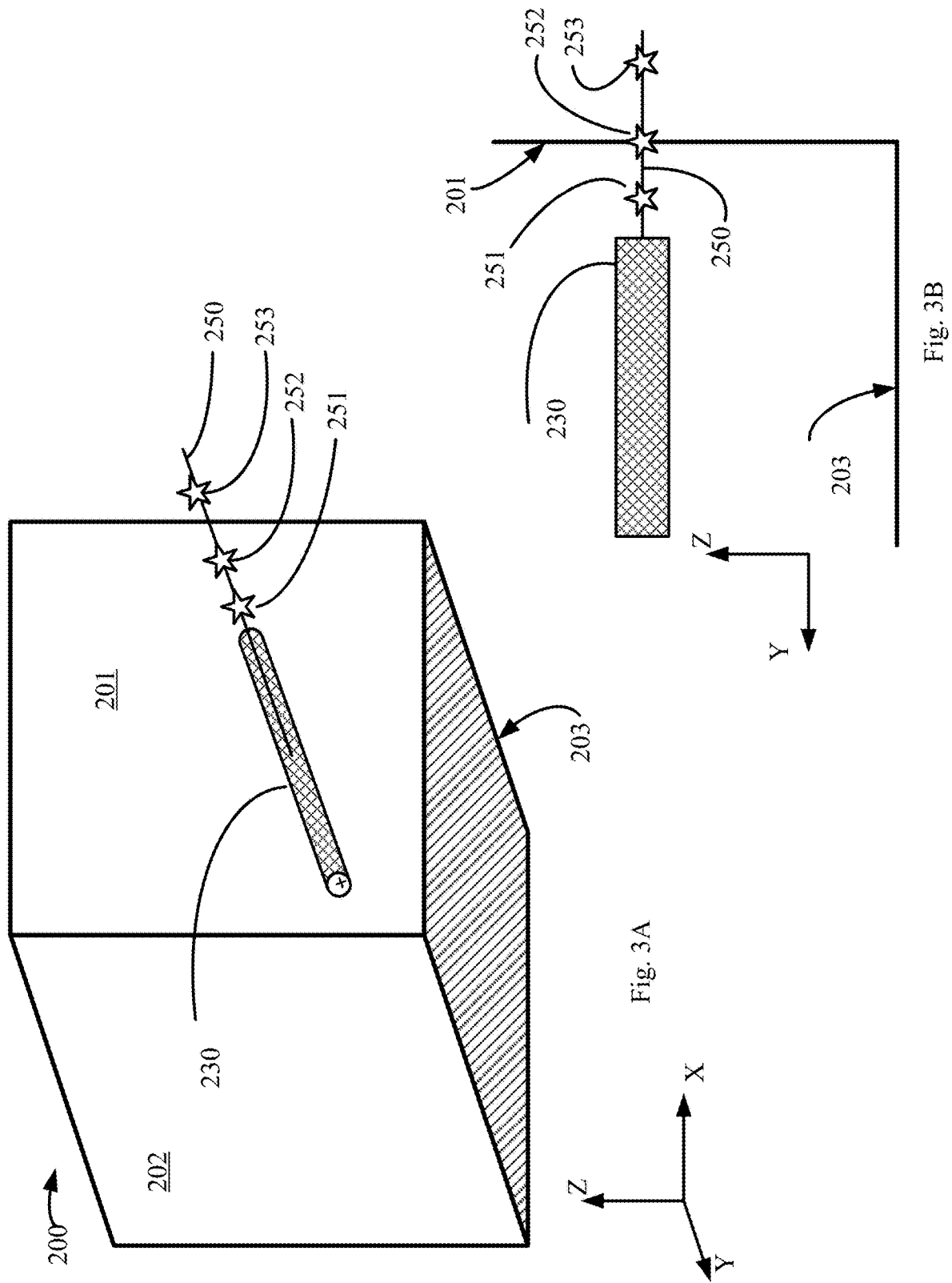

RAPID POSITIONING DRAWING SYSTEM AND METHOD

TECHNICAL FIELD

Embodiments generally relate to computer-aided design systems, more particularly, embodiments relate to 3D design programs.

BACKGROUND ART

Development, construction, and management of large-scale capital projects, such as power plants (e.g., a coal fueled power generation facility), capital ships (e.g., military shipping, cruise ships, or cargo ships), and off-shore oil platforms, requires coordination of processes and data on a scale that is orders of magnitude greater than those of smaller, common projects (e.g., building and selling a ten room house). Large-scale capital projects consequently often require a substantially more comprehensive production and management solution.

In response to this need, those skilled in the art have developed comprehensive 3D design programs (e.g., SmartPlant® Enterprise, distributed by Hexagon PPM, previously known as Intergraph, Inc., of Huntsville, Ala.) that are specially configured for the rigors of such large capital projects. Such 3D design programs are typically used by engineers as a tool to facilitate their engineering work in designing, or modifying an existing design for, a capital project. Among other things, this type of design program (also referred to as a "plant program") can be implemented as a broad application suite that manages most or all phases of a large-scale capital project, from initial conception, to design, construction, handover, maintenance, management, and decommissioning.

Modeling of objects in a capital project typically involves design in a such a CAD system.

Objects in a capital project are typically positioned relative to each other considering various factors. For example, an operator (typically an engineer) using a CAD system may desire to maintain a minimum distance between two objects. In such circumstances, it is typically required for the engineer to find a suitable position for a second object (e.g., a new object to be added to a CAD drawing; or an existing object to be moved within the CAD drawing), considering one or more other objects (each a "first" object) in the CAD drawing, where each first object and second object in the CAD drawing represents an physical object in (or to be built in) the capital project.

For example, the operator of the CAD system has in mind, for such a second object:
 "what" object to place (e.g., a Pipe/duct/cabletray of a specific size, in a given direction)
 "where" approximately to place the object.

A precise position for the second object is finalized after considering existing first objects, desired clearances between the second object and a first object, etc.

For some linear objects like pipes, ducts, cable trays, etc., it is not just the initial position. Typically the modeling of physical objects involves multiple positions, each of which individually or collectively indicate the routing of the object, for example the routing of a Pipe, Cabletray, Duct etc.

Often there is a need to find next points towards a surface of the enclosure (room, hall etc.)—e.g., walls, ceilings, floors. This is where an intended direction of routing an object comes into play and hence finding positions of interest in that direction towards the surface of interest, and finding a point near such surface considering clearances to such surface in continued routing comes into play.

A design program's display of the drawing of the factory may not provide reference points to allow a CAD system operator to accurately position a second object on the display to assure that required clearance between the second object and a first object. Consequently, the operator may guess as to the desired location of the second pipe and place the second pipe accordingly, and then use a ruler (e.g., a tool built in to the CAD program to allow an operator to measure a distance between one point in a CAD drawing and another point in the same CAD drawing) to ascertain whether the distance separating the first object from the second object meets the operator's desired clearance distance. If the location of the second object fails to meet the desired clearance distance, then the operator must revise the drawing and try again. This approach is inefficient, and potentially inaccurate because it is a subjective process performed by human CAD operators. Alternatively, the operator may simply place the second object a great distance from the first object to be sure that the clearance is sufficient to meet the operator's desire, but this results in wasted space if the clearance is greater than the minimum desired clearance. Conventional method and systems are driven by subjective determinations rather than specific, limited mathematical rules.

SUMMARY OF VARIOUS EMBODIMENTS

A first embodiment is a computer-implemented method for adding an element to a computer-aided design drawing on a computer-aided design system having a computer display. The first embodiment includes providing a CAD drawing referenced to a 3D coordinate system. The CAD drawing includes a first element representing a first physical object of a capital project. For example, in illustrative embodiments, the first element represents a physical object to be included in a structure or apparatus to be constructed or produced. The first element has associated first data describing physical dimensions of the first physical object.

The method also includes receiving (by the CAD system) operator input indicating a second element to be added to the CAD drawing, the second element representing a second physical object of the capital project. The second element has associated second data describing physical dimensions of the second physical object.

Some capital projects include requirements that are beneficially taken into account during creation or editing of the CAD drawing. For example, a capital project may include two pipes, but require that the second pipe be at least a minimum distance from the first pipe. To that end, the method also includes receiving clearance data describing a minimum distance to be maintained, in the completed capital project, between an outer surface of the first physical object and an outer surface of the second physical.

The method further includes displaying the CAD drawing on the computer display, and automatically generating and displaying, over the CAD drawing on the computer display, a set of visible indicators (or "glyphs"). In illustrative embodiments, each visible indicator of the set of visible indicators does not represent a physical object of the capital project. Instead, each visible indicator (of the set of visible indicators) indicates a point within the coordinate system such that placement of the second element at such visible indicator would—when the second physical object is placed within the physical capital project—satisfy the minimum distance between the first physical object and the second physical object.

The method also includes receiving, from an operator of the CAD system, a command selecting at least one visible indicator (each of which may therefore be referred-to as a "selected" visible indicator), the at least one selected visible indicator representing the operator's selection of a position within the 3D coordinate system for placement of the second element into the CAD drawing.

For example, an embodiment may include receiving, from an operator of the CAD system, a command to review a list of positions calculated at runtime and eventually select at least one visible indicator (which may therefore be referred-to as a "selected" visible indicator), the at least one selected visible indicator representing the operator's selection of a position from a set of options for positions within the 3D coordinate system for placement of the second element into the CAD drawing.

Stated alternately, some embodiments include receiving (by the CAD system) operator input indicating a position or a sequence of positions to use in the placement of the second element to be added to, or modified in, the CAD drawing.

Some embodiments of the method go a step further, and include automatically placing (or modifying a previous placement of) the second element into the CAD drawing according to the operator's selection of a position.

Various other embodiments include additional steps or details.

For example, in some embodiments, the step of displaying, on the computer display, both the CAD drawing and a set of visible indicators, includes automatically generating the set of visible indicators based on a reference point (e.g., a point on the first element, as specified by the CAD operator; the reference point may be referred-to as, and/or illustrated as, a "spider"), the first data, the second data, and the distance data. To that end, some embodiment also include receiving, from the operator, operator input indicating a reference point of the first element.

In some embodiments, displaying (over the CAD drawing on the computer display) the set of visible indicators includes displaying at least two visible indicators simultaneously. In alternative embodiments, displaying (over the CAD drawing on the computer display) the set of visible indicators includes displaying at least two visible indicators sequentially, each displayed in response to another operator input.

In terms of receiving operator input indicating a reference point of the first element, some embodiments include: obtaining the position of a mouse pointer within the 3D coordinate system (which may be referred-to as the "captured pointer position"), where the pointer position indicates a center point of the first element.

Some embodiments also include freezing the mouse pointer on the display at the captured pointer position. In those embodiments, the step of receiving, from the operator of the CAD system, a selection of at least one visible indicator includes receiving such operator selection via a second input device of the CAD system, said second input device being distinct from the mouse. For example, the second input device may be a keyboard; a track ball; or a touch pad or a track pad.

In some embodiments, a first element of the CAD drawing represents a room surface, such as a wall, ceiling or floor, to name but a few examples. In such embodiments, the step of automatically generating and displaying a set of visible indicators (over the CAD drawing on the computer display) includes: calculating a plurality of useful positions relative to the room surface (for example, a wall) to facilitate routing a first portion of the second element (for example, a first portion of a pipe) toward the room surface in a first direction, and routing a second portion of the second element (for example, a second portion of the pipe) in a second direction, different from the first direction (for example, after a bend in the pipe), while maintaining the minimum distance between the first physical object (the wall) and the second physical object (the pipe, and specifically the second portion of the pipe) when construction of the first physical object and the second physical object in the capital project is complete. As an additional example, in some embodiments, the second direction is parallel to the room surface (for example, the second portion of the pipe runs parallel to the wall in the constructed capital project).

With regard to the step of receiving clearance data, various embodiments do so in different ways. For example, in some embodiments, receiving clearance data includes receiving (or retrieving) clearance data from a memory accessible from the CAD system. In other embodiments, receiving clearance data includes receiving clearance data from the operator via a user interface of the CAD system. In some such other embodiments, such clearance data from the operator overrides clearance data from a memory accessible from (or received from or retrieved from) the CAD system.

Other embodiments include CAD systems that are configured to execute embodiments of methods, including (but not limited to) those methods described above. Such CAD systems may include executable computer code, or have access to and be provide with executable computer code, which (when executed on the CAD system's computer processor), cause the CAD system to perform such methods.

BRIEF DESCRIPTION OF THE DRAWINGS

Those skilled in the art should more fully appreciate advantages of various embodiments from the following "Description of Illustrative Embodiments," discussed with reference to the drawings summarized immediately below.

FIG. 3A schematically illustrates an embodiment of a CAD drawing of a room;

FIG. 3B and FIG. 3C schematically illustrate creation of the CAD drawing of the room at described stages;

DESCRIPTION OF ILLUSTRATIVE EMBODIMENTS

Figure 1A:
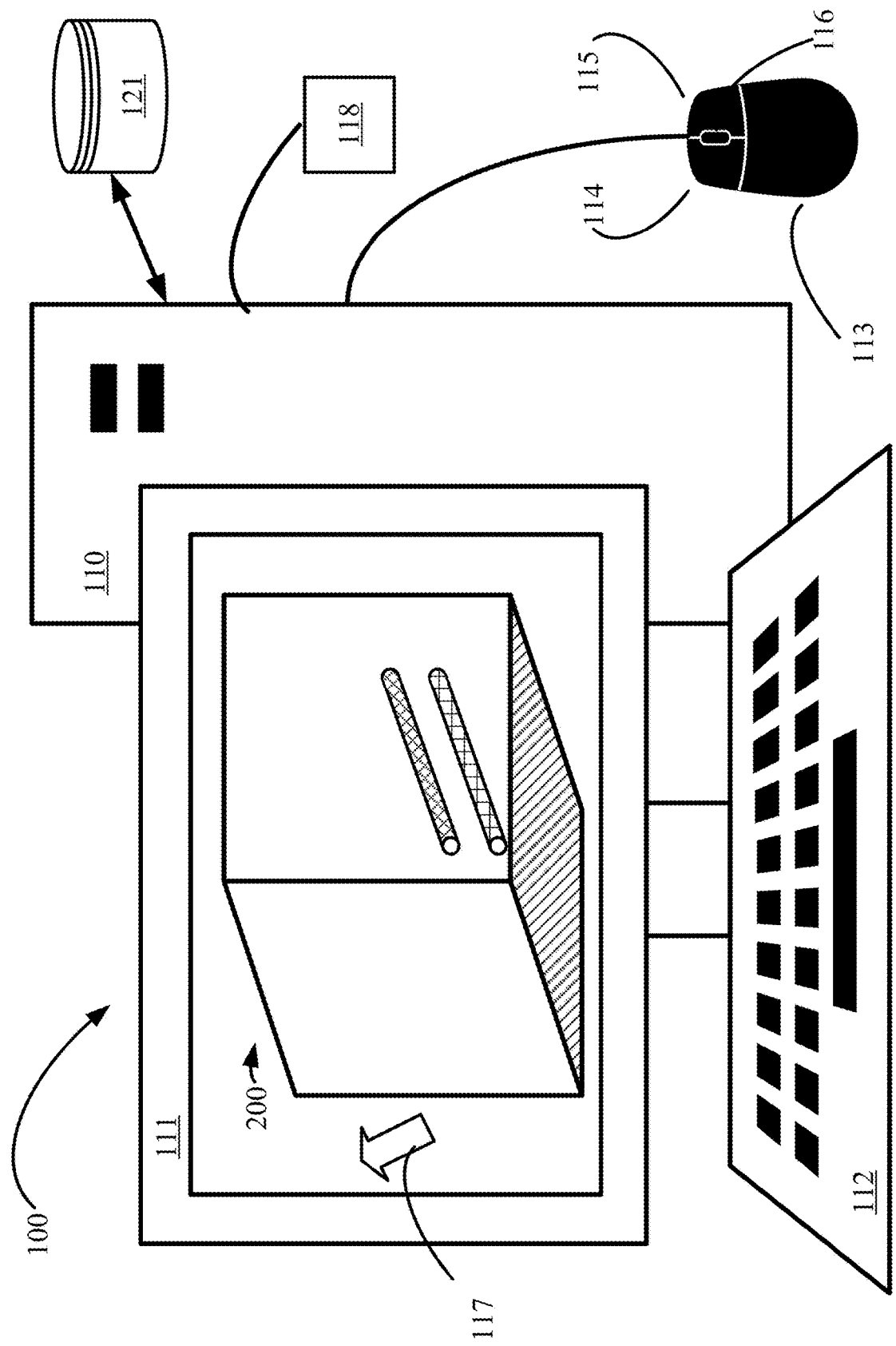
FIG. 1A schematically illustrates an embodiment of a computer-aided design ("CAD") computer according to embodiments described herein.

Illustrative embodiments enhance features of, and use of, CAD systems for making and editing CAD drawings. Each CAD drawing is, in a typical application, a drawing of a capital project (e.g., a building or ship, to name but a few examples) to be physically constructed, or a drawing of a capital project already constructed and to be modified.

For example, illustrative embodiments provide on-screen visual cues to the user (typically an engineer; sometimes referred to as an "operator" or "modeler"), which visual cues are not part of the CAD drawing, but which enable to user to quickly and accurately place a new object into the CAD drawing, while satisfying desired design expectations (e.g., parameters) on the location of the new object relative to other objects in the CAD drawing. For example, a desired parameter might specify that an object, such as a pipe or conduit to name but a few examples, is to be at least a specified distance from another object, such as a machine, wall, or other pipe or conduit. A parameter may be desired because it comports with the CAD operator's engineering experience or practice and is therefore a matter of preference or judgment on the part of the CAD operator, or because it is imposed on the design of the capital project by the project owner or other party for example.

Illustrative embodiments render the CAD system easier to use, and improve the ability of the CAD system to produce more accurate CAD drawings. For example, without the embodiments described herein, a user could construct, within a CAD drawing, one or more temporary objects—e.g., lines, arcs, circles, intersection points, datums, etc., which do not represent permanent objects in the CAD drawing, but which are added by the CAD system operator temporarily to either help geometrically calculate the final desired position, or to indicate to the user places within the drawing where a new object could not be placed (e.g., because in those places the new object would violate a desired parameter, such as being too close to another object of the CAD drawing), or to indicate to the user places where such a new object could be place (e.g., because in those places the new object would not violate a desired parameter). Such approaches are less desirable than embodiments described herein not only because they require extra effort by the user (e.g., creating, and later deleting, such temporary objects) and thereby distract the user from the task of creating and editing object that are part of the CAD drawing, but are also prone to human error.

Some CAD systems offer a grid, which is a drawing tool that typically includes a pattern of regularly spaced dots or lines which make the alignment and drawing of objects easier. The grid is not part of the CAD drawing being edited, but is displayed on screen as an aid to the user. Some CAD systems offer a "snap to grid" tool, which constrains all drawing elements, or end points of drawing elements, to grid points. In other words, using "snap to grid" functionality a drawn element will automatically "snap to" a point on a grid, wherein the grid is not part of the CAD drawing. Snap to grid functionality is distinct from present embodiments at least in that present embodiments allow the user to select where the drawn element goes (the CAD system does not constrain the positing of a drawn element to a grid point), and/or because the indicators and projection points of illustrative embodiments are referenced to an object that is part of the CAD drawing being edited rather than to such a grid. Illustrative embodiments may be used in with or without a grid, and with or without "snap to grid" functionality. Present embodiments are also distinguishable from constraint solving to auto adjust positioning of a set of objects, at least in that such constraint solving is conventionally operated only after the objects are placed, unlike present embodiments which are used while placing the 2nd object.

Some illustrative embodiments include methods and systems to rapidly and precisely find desired positions for use in placement of a new ("second") object, or modification of the location of an existing second object, in a CAD drawing, relative to a position of interest located on/relative to another ("first") objects. In illustrative embodiments, the relative positioning involves desired clearances between first and second objects, which are based on various factors potentially including the data of the first and second object(s).

Some illustrative embodiments include methods and systems configured to learn about useful surfaces of a modeled region (a room for example), with an intent to find candidate surface(s) in the intended direction of the second object being placed/modified, eventually to find positions of interest relative to the candidate surface(s) usable for the second object being modeled.

Some illustrative embodiments include methods and systems configured to calculate positions of interest at specified clearances from such surfaces.

Some illustrative embodiments include methods and systems configured to calculate positions of interest at specified clearances from existing positions of existing objects.

Some illustrative embodiments include methods and systems configured to offer (display; all-at-once or one-by-one or a combination) such calculated positions to the CAD system operator.

Some illustrative embodiments include methods and systems configured method to facilitate CAD system operator review of the calculated positions and choose one for placement of a new second object, and/or modification of an existing second object.

In illustrative embodiments, the desired clearances may be determined by the CAD system operator (e.g., an engineer using the CAD system as a tool to perform the engineer's engineering duties), or CAD system memory or database, another (e.g., remote) memory or database, or could be determined by application of a rule.

Illustrative embodiments provide one or more of the following improvements over conventional CAD systems.

Some embodiments improve a CAD system's ability to enable a CAD operator to add a new (e.g., "second") element to, or modify an existing second element within, a CAD drawing by increasing the speed (or "rapidness") with the CAD operator can identify acceptable positions for placing the new element within an existing CAD drawing. For example, illustrative embodiments employ rules to automatically determine a set of such positions, display the set of such positions, and provide a quick and easy way to allow the operator to select one or more such positions.

Some embodiments improve a CAD system's ability to enable a CAD operator to add a new ("second") element to, or modify an existing second element within, a CAD drawing by reducing, relative to conventional CAD systems, the number of sub-steps required for the CAD operator to determine and select the desired position of the new element with a CAD drawing.

Some embodiments improve a CAD system's ability to enable a CAD operator to add a new element to, or modify an existing second element within, a CAD drawing by mitigating or eliminating the volatility of a user-controlled specification of position within the CAD. For example, when using a mouse to control an on-screen pointer to select a position within a CAD drawing, the position of the pointer (and any point within the CAD drawing specified by moving the pointer) may be very volatile based on slight, or unintentional, movement of mouse.

Some embodiments improve a CAD system's ability to enable a CAD operator to add a new element to, or modify an existing second element within, a CAD drawing by reducing or eliminating CAD system operator fatigue (or "modeler fatigue") involved in arriving at desired positions of the new element with a CAD drawing.

Some embodiments improve a CAD system's ability to enable a CAD operator to add a new element to, or modify an existing second element within, a CAD drawing by eliminating the need for the CAD operator to add to the CAD drawing construction lines or geometry, which construction lines or geometry, is not part of a the structure or apparatus being represented by the CAD drawing.

In the prior art systems and methods, a CAD operator would have to subjectively identify a satisfactory placement position for a second object (i.e., one that meets the desired clearance distance) and manually place or draw the second element accordingly. Alternatively, in prior art systems and methods, a CAD operator would have to subjectively identify a problematic object placement (i.e., one that failed to meet the desired clearance distance) and manually fix it by moving (i.e., changing the position of) a first object or second object. Some embodiments, in contrast, use rules to automatically set satisfactory clearance distance between objects to facilitate or assure that the distance between a first object and a second object (e.g., both as shown in the CAD drawing and in the physical project once constructed) satisfy the desired clearance distance.

Definitions: As used in this description and the accompanying claims, the following terms shall have the meanings indicated, unless the context otherwise requires.

A "set" includes at least one member.

The term "CAD" means "computer-aided design."

The term "global coordinate system" means, with regard to a CAD drawing, the coordinate system to which the entire CAD drawing is referenced.

The term "local coordinate system" means a coordinate system to which a portion of the CAD drawing is referenced, the portion being less that the entire CAD drawing. In some CAD drawings, a local coordinate system has axes parallel to corresponding axes of the global coordinate system of the CAD drawing, such that the local coordinate system is said to be aligned with the drawings global coordinate system. In other CAD drawings, at least one axis of the local coordinate system is not parallel to a corresponding axis of the global coordinate system of the CAD drawing, such that the local coordinate system is said to be not aligned (or un-aligned) with the drawings global coordinate system.

A "command" is a computer-implemented operation by which a computer processor selects or identifies a set of positions from 3D space where some existing model object exists.

A "point locator" is a computer-implemented component configured to find, in 3D model space around the mouse pointer position in a given viewing direction, a single 3D world position and object(s) based on object(s) like line(s), surface(s), edge(s), etc. located near the mouse pointer position in a 2D View.

To "place" an object in a CAD drawing means, in some embodiments, to add a new object into the CAD drawing. In other embodiments, to "place" an object in a CAD drawing means to move a pre-existing second object from one position, location or orientation (e.g., an initial or current position, location or orientation) to another position, location or orientation with in the CAD drawing.

A "Rapid Spatial Positions Calculator" is a computer-implemented component that calculates multiple positions based on context, displays those positions as a set of visible indicators on the display screen of a CAD system. In illustrative embodiments, the CAD system allows a user, working via a user interface or other input device such as a mouse, trackball, trackpad, joystick or keyboard, to view, select, and send the selected position to a Command.

To "use" a visible locator (glyph) displayed over a CAD drawing is to place a second object relative to the visible locator such that the outer surface of the second object is at a satisfactory distance from the outer surface of a first object. For example, in some embodiments, the visible locator is displayed at a position such that placing a centerline of a second object on the visible locator will position the second object such that the outer surface of the second object is at a satisfactory distance from the outer surface of a first object. In other embodiments, the visible locator is displayed at a position such that placing the surface of the second object on the visible locator will position the second object such that the outer surface of the second object is at a satisfactory distance from the outer surface of a first object.

A "satisfactory" distance is a distance between the outer surface of a second object and the outer surface of a first object that meets a specified or desired clearance distance.

Figure 1B:
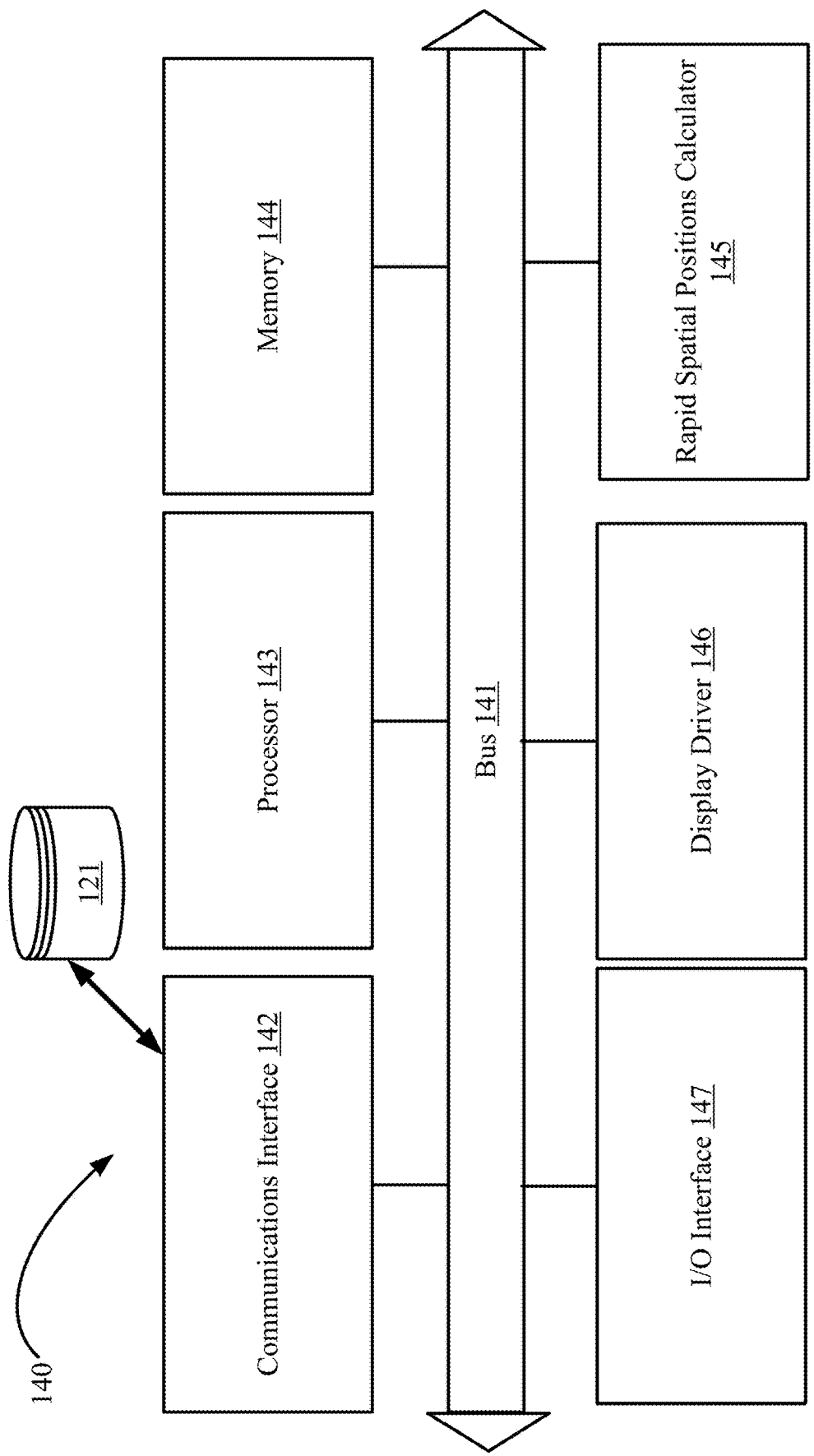
FIG. 1B schematically illustrates an embodiment of a system according embodiments described herein.

FIG. 1A schematically illustrates a CAD system 100 for use by an operator (or "user;" in either case, typically an engineer) according to any of the embodiments described herein. The CAD system 100 in this illustrative embodiment includes a computer 110 operatively coupled to a computer display 111, a keyboard 112, and a pointing device 113 (e.g., in illustrative embodiments, the pointing device may be a mouse having a left mouse button 114, a right mouse button 115, and a mouse wheel 116). The computer 110 may include, or be in communication with, a non-volatile computer memory (e.g., memory 144; FIG. 1B) configured to store non-transient instructions for execution by the computer's processor circuit, and/or editable CAD drawings, among other data.

The computer may constitute, at least in part, a system 140 as schematically illustrated in FIG. 1B. The system 140 includes several modules in communication over a communications bus 141. The modules may include a communications interface 142 configured to communicatively coupled to a network, and configured to send and receive data over the network. For example, the communications interface 142 may send CAD drawings to, and/or receive CAD drawings from, a remote computer or database 121 coupled to the network. Alternatively, or in addition, the communications interface 142 may send computer executable instructions to, and/or receive computer executable instructions from, a remote computer or database 121 coupled to the network. Alternatively, or in addition, the communications interface 142 may receive operator input from, and/or display menus and CAD drawings to, an operator working on a remote terminal. The system 140 may also include a processor module 143 including a computer processor, such as a semiconductor processor available from Intel Corporation for example. The system 140 may also include a computer memory 144. The system 140 may also include a rapid spatial positions calculator 145, configured to calculate positions and generate glyphs, as described below. The system 140 may also include a display driver configured to communicate with a display devices 111 and cause the display device 111 to display a CAD drawing, a pointer, glyphs, and a graphical user interface, to name but a few examples. The display driver 146 may also be configured to receive, from a display device, input from a CAD system operator, for example when the display device includes a touch-screen. The system 140 may also include an input/output interface 147 configured to interface with input devices (e.g., mouse 113) to receive user input to move a pointer 117 displayed on the display 111, and/or to receive other user input such as mouse clicks, as known in the computer arts.

Figure 1C:
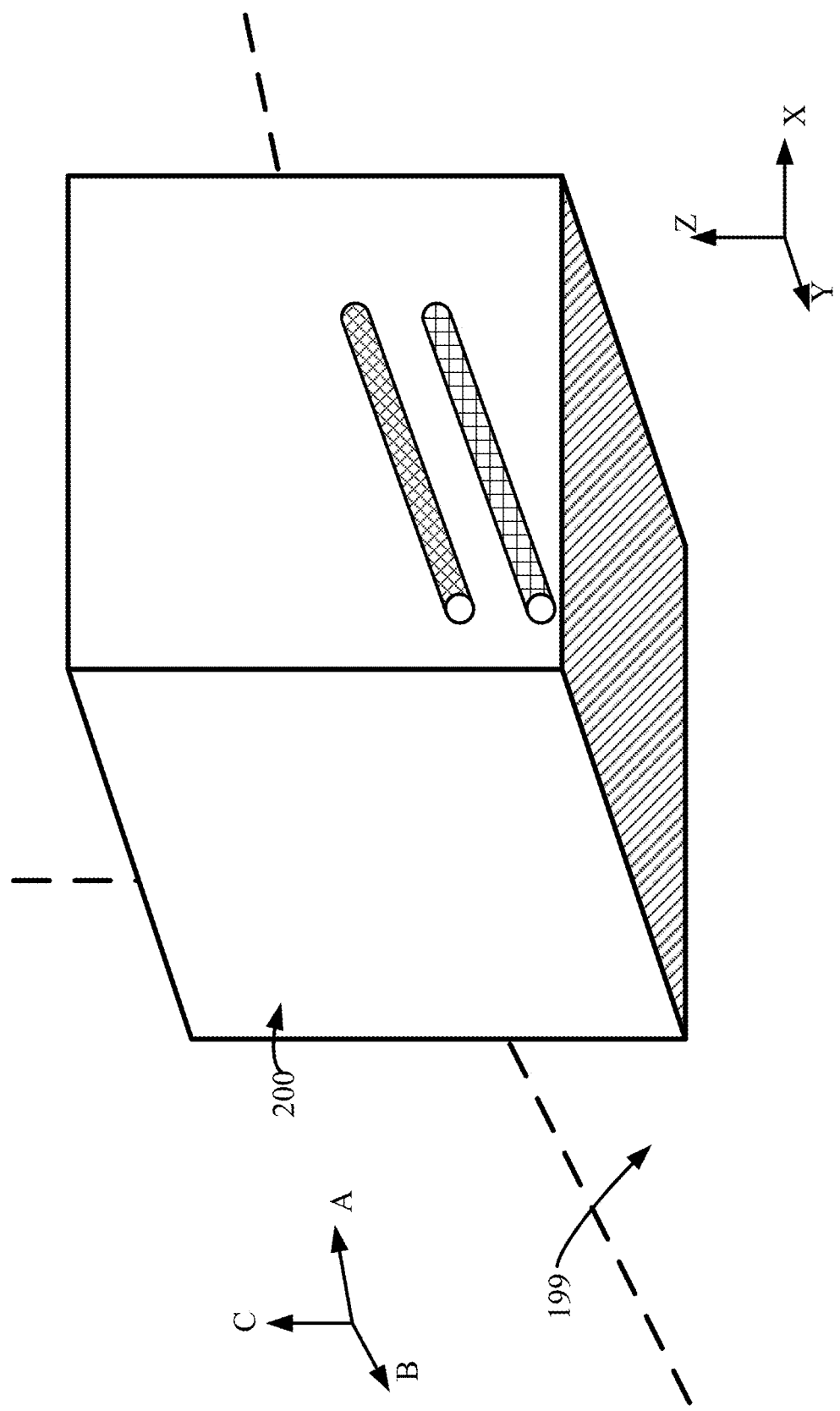
FIG. 1C schematically illustrates an embodiment of a CAD drawing having a local coordinate system in the context of a greater capital project drawing having a global coordinate system.

FIG. 1C schematically illustrates a CAD drawing 200 having a local coordinate system having mutually orthogonal axes X, Y and Z within the context of a capital facility (shown in dashed lines) having a global coordinate system having mutually orthogonal axes A, B and C. For instance, the structure in CAD drawing 200 may represent a small room with two pipes, all within a larger building 199 represented by dashed lines.

Figure 2A:
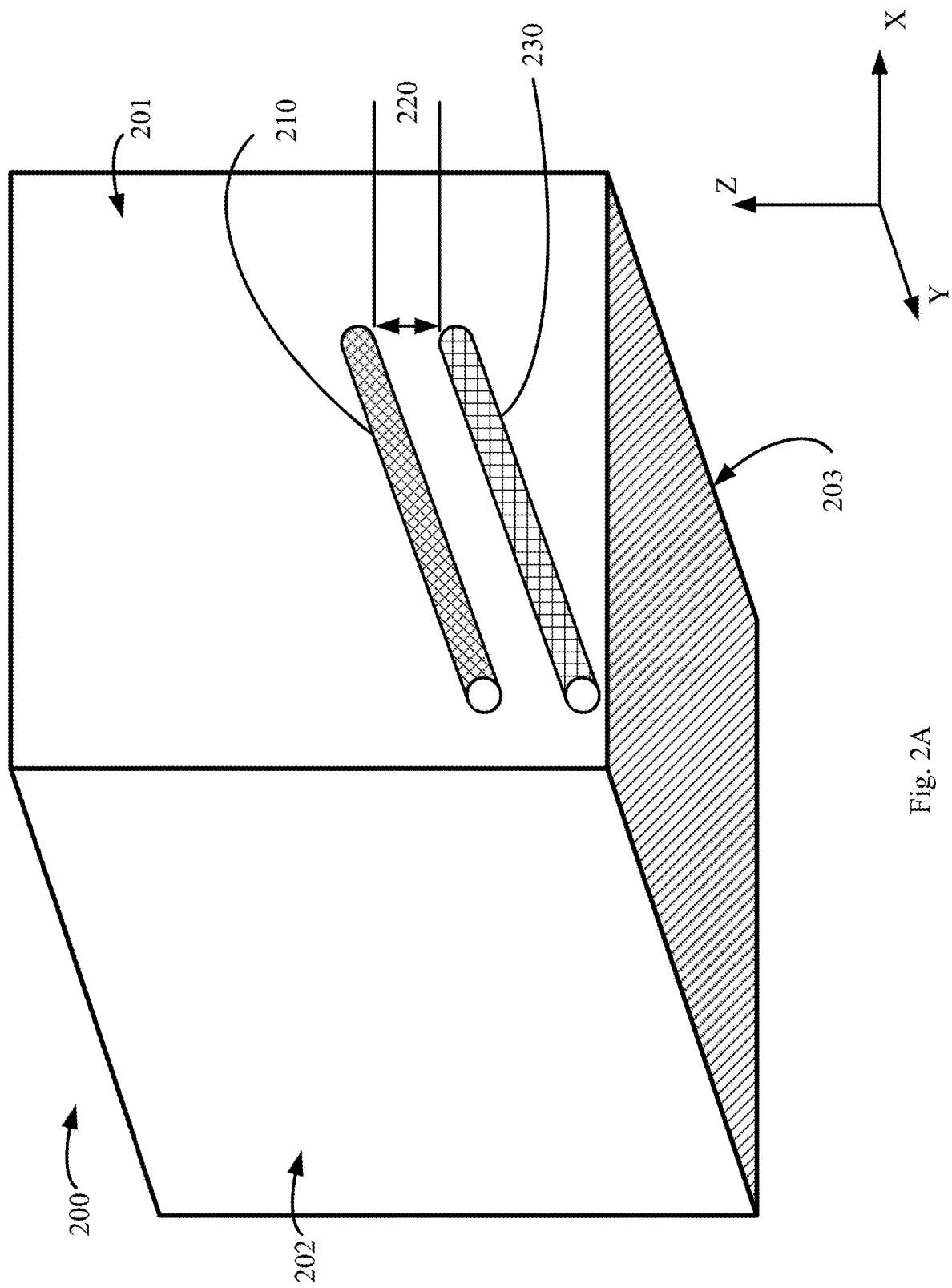
FIG. 2A schematically illustrates an embodiment of a CAD drawing of a room.

FIG. 2A schematically illustrates a CAD drawing 200 as displayed on a CAD system display 111. The CAD drawing 200 in this example is of a portion of a capital project (e.g., a building, ship or other moveable vessel), such as a room. The room has a floor 203, and walls, and may have a ceiling. This illustrative embodiment shows wall 202 and wall 203, but omits other walls and ceiling for clarity.

The CAD drawing 200 also shows two objects 210 and 230, each of which is a physical object to be constructed in (or perhaps previously constructed in) the capital project. In this illustrative embodiment, object 210 is a first cylindrical pipe, and object 230 is a second cylindrical pipe. Objects in embodiments are not limited to cylindrical pipes, however. For example, one or more objects could be a cable tray (e.g., having a rectangular cross-section with a center point), or an item of equipment such as a pump, engine, boiler, or reaction vessel, to name but a few examples. The CAD drawing 200 is shown relative to a coordinate system having three orthogonal axes, labeled X, Y, and Z. In some embodiments, the coordinate system is a global coordinate system, and in other embodiment the coordinate system may be a local coordinate system.

The first object 210 and the second object 230 are shown as having a clearance distance 220 between them. The clearance distance 220 may be determined and specified by the CAD system operator. For example, the CAD system operator may specify the clearance distance 220 according to the CAD system operator's own preferences, based on experience for example. As another example, the clearance distance may be specified by design requirements for the capital project.

Figure 2B:
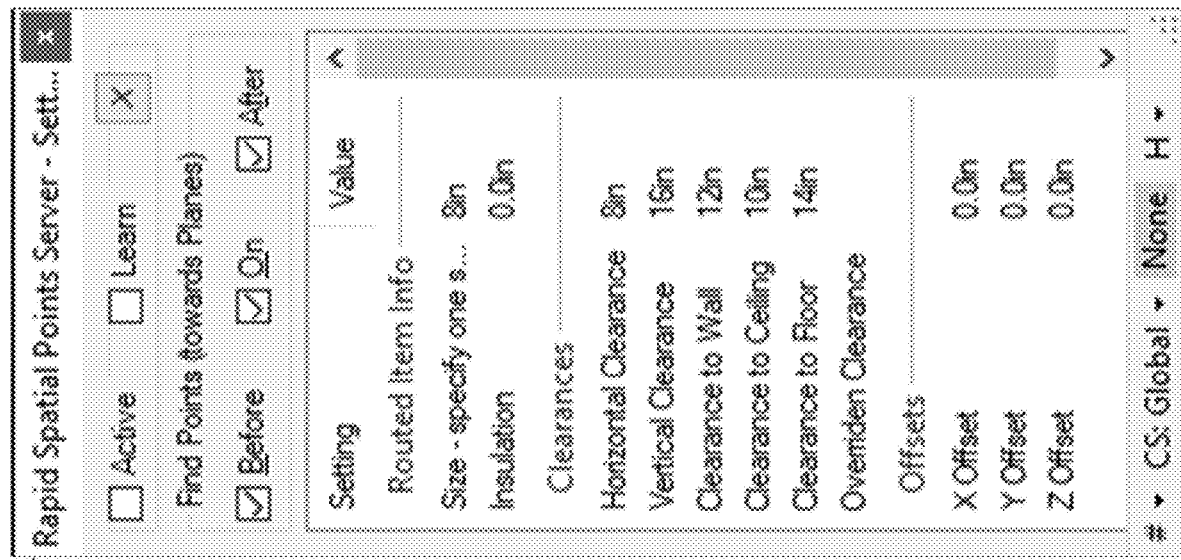
FIG. 2B, FIG. 2C, FIG. 2D, and FIG. 2E schematically illustrate creation of the CAD drawing of the room at described stages.
Figure 2B:
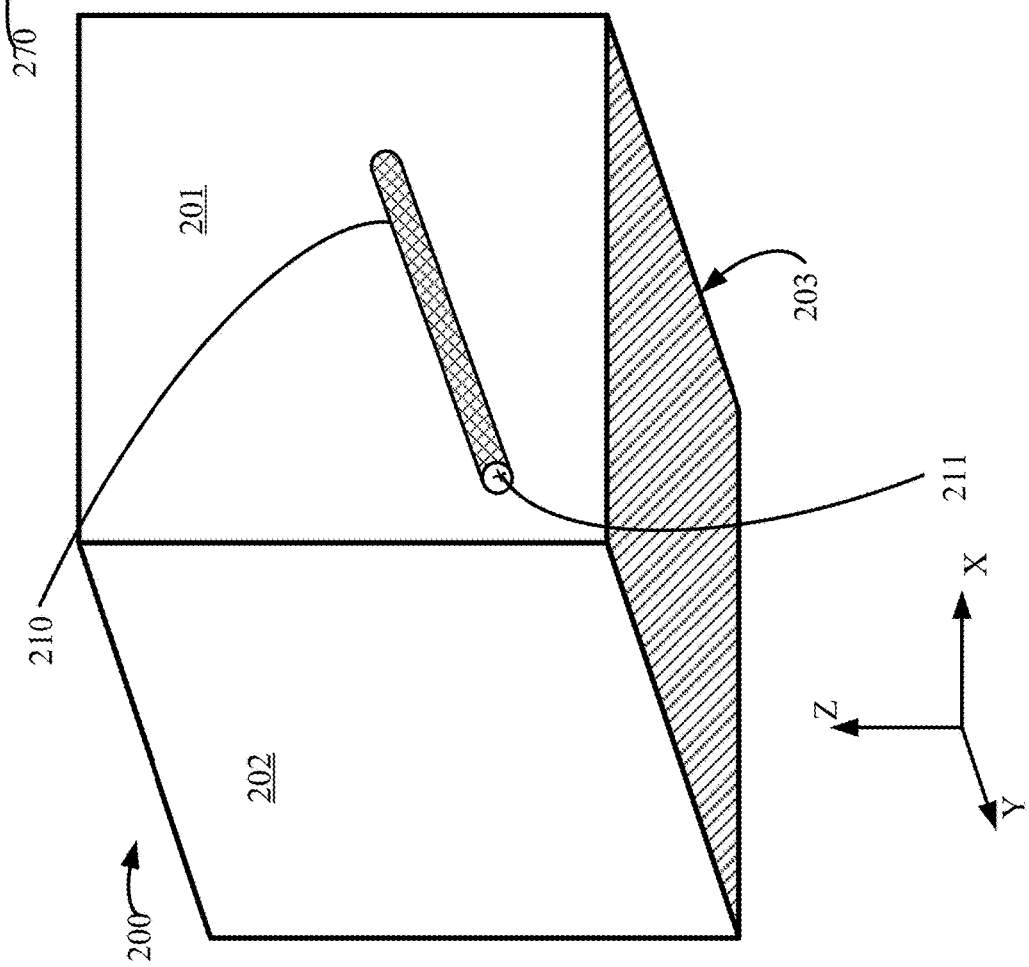
Figure 2C:
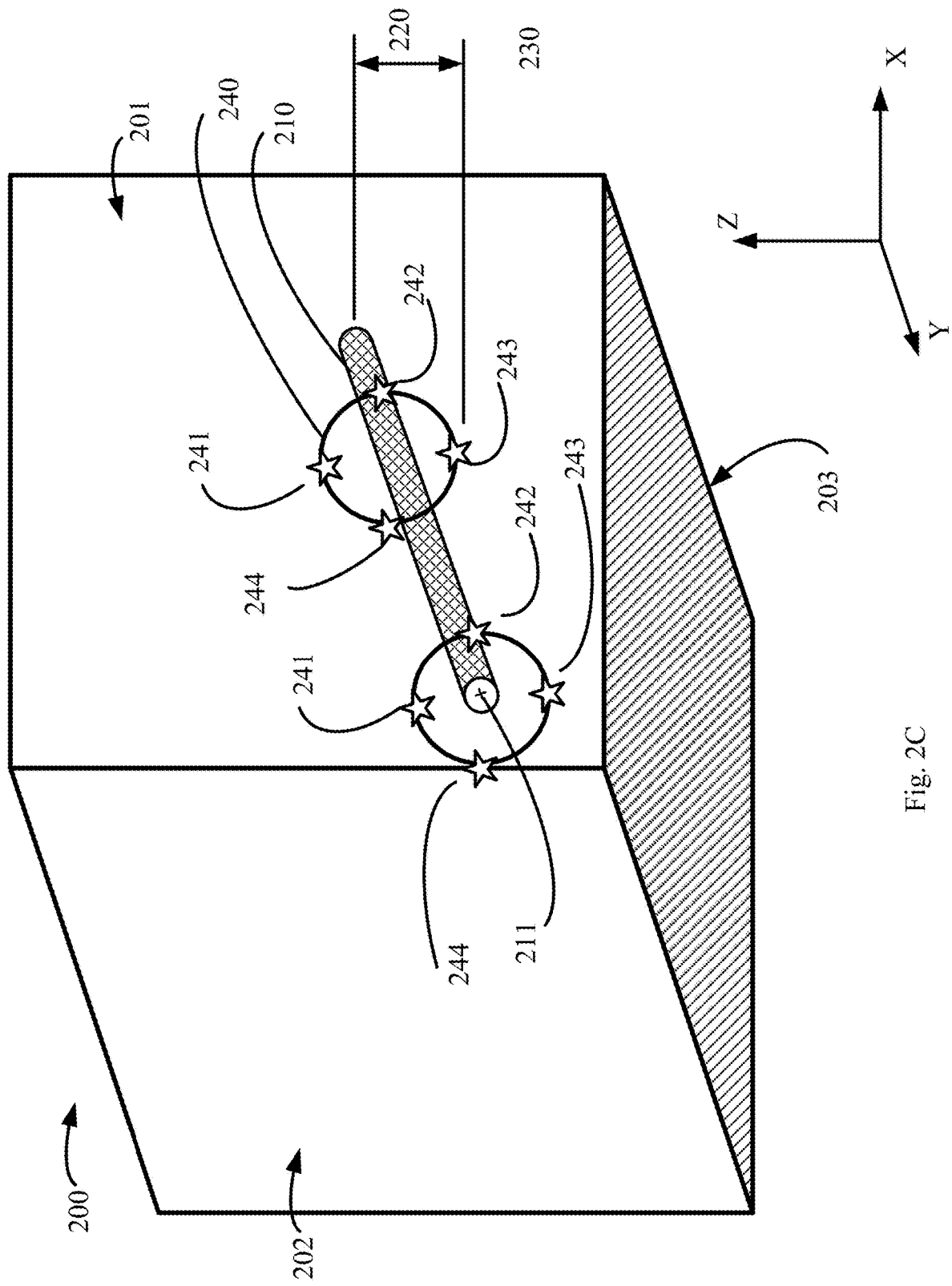

The second object 230 in the CAD drawing 200 of FIG. 2A runs parallel to the first object 210, such that a surface of second object 230 has a plurality of points that are equidistant from corresponding nearest points on a surface of the first object 210. Embodiments are not limited to such parallel objects, however. In other embodiments, the second object 230 may be disposed at an angle to the first object 210, such that there is only one point of nearest approach between the first object 210 and second object 230, as schematically illustrated in FIG. 2E for example.

Figure 4A:
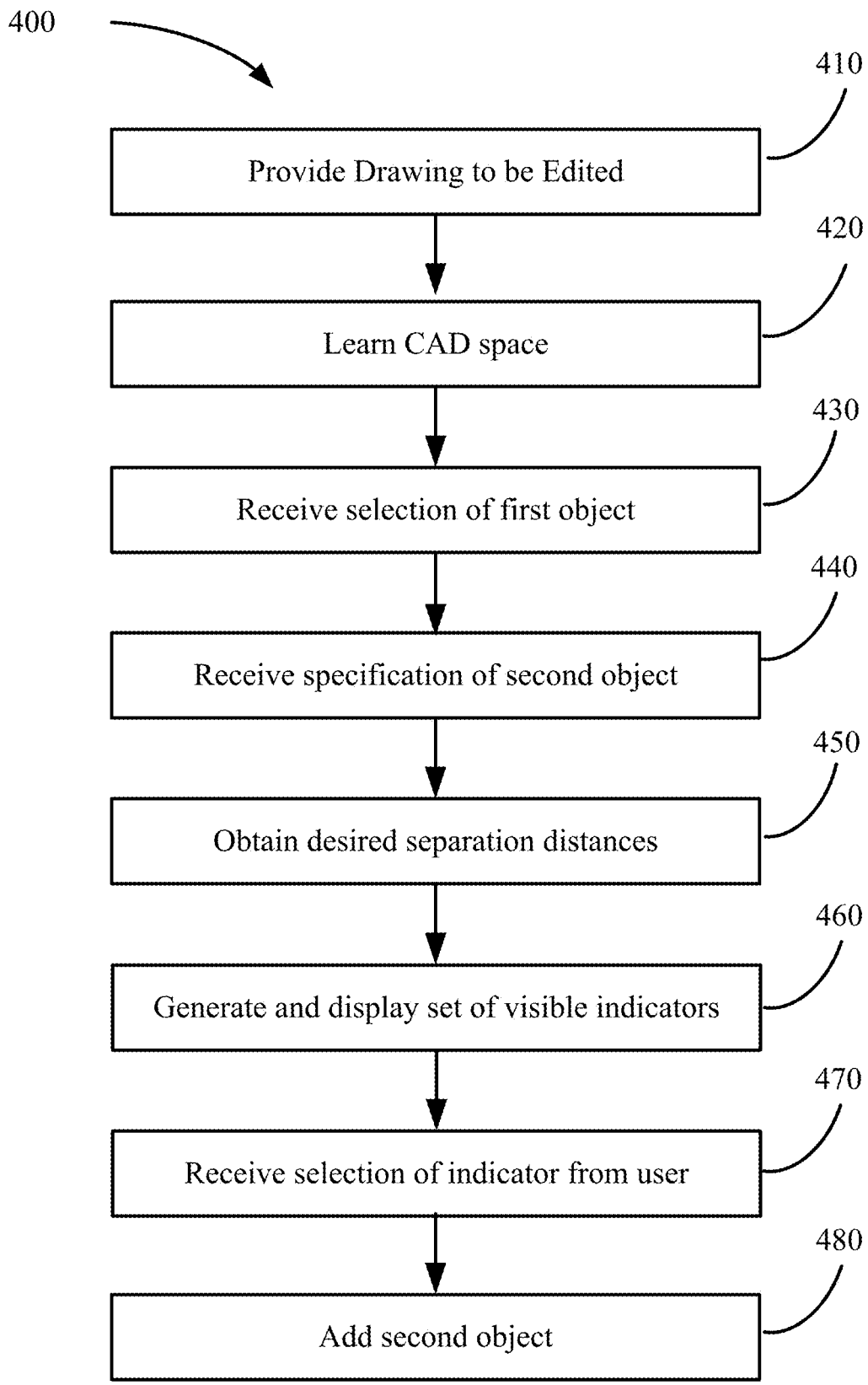
FIG. 4A is a flow chart of a method for creating or editing a CAD drawing according to various embodiments.

A CAD system operator may create or edit such a CAD drawing 200 according to the method 400 of FIG. 4A.

At step 410, the method includes providing the CAD drawing 200 to be edited. In some embodiments, the CAD drawing 200 could be a pre-existing CAD drawing to be edited. The method 400 could include retrieving the pre-existing CAD drawing, e.g., from a CAD system memory 144, or from a database 121 with which the CAD system is in operable communication. In some embodiments, the CAD drawing 200 is a new CAD drawing created by the CAD system operator for example by drawing the walls 201, 202 and floor 203, and drawing the first object 210, prior to adding the second object 230. Each of those drawing elements has a set of associated physical dimensions. For example, the floor may have physical dimensions in the X and Y axes. Each wall may have physical dimensions in the X and Z axes, or the Y and Z axes, respectively. Some features may have physical dimensions in all three of the orthogonal axes (X, Y, and Z), for example, as in a cabletray or duct. The first object 210 may be described has having a depth in the Z axis, a width in the X axis, and a length in the Y axis.

In some embodiments, the first object may also be described by "first data" as having a diameter measured from a center point of the first object and a length in the Y axis, for example. In some embodiments, the first object 210 may be described as having dimensions that exceed the dimensions of the object itself. For example, the first object 210 may be a cylindrical pipe having a first diameter to its outside surface, but may also be wrapped in insulation of a known thickness. In such an embodiments, the outside surface of the first object 210 is not the outside surface of the cylindrical pipe, but is instead the outside surface of the insulation. In such embodiments, the dimension of the first object may be specified as the dimension of the pipe and the insulation combined. For example, the diameter of the first object may be specified from the axis of the cylindrical pipe out to the outer surface of the insulation. The dimensions of a second object 230 may be specified in the same way, e.g. using corresponding "second data." This allows the CAD system 140 to know the location, within the coordinate system, of the outer surface of an object (e.g., first object 210; second object 230). This may be important, for example, when the CAD system operator desire to place a second object 230 to assure a desired clearance 220 between the first object 210 and the second object 230. In situations where the first and/or the second objects have non-uniform dimensions (i.e. width and depth of different sizes) as in a cabletray or a duct, then those respective dimensions and orientation of the first and second objects are used by the rapid spatial points calculator 145 to know the location, within the coordinate system, of the outer surface of an object (e.g., first object 210; second object 230) to arrive at the calculated positions.

The first data and second data, and desired clearance distance between them, may be specified by the CAD system operator via the graphical user interface 270 displayed on the CAD system's display 111. An embodiment of such a graphical user interface is schematically illustrated in FIG. 2B. For example, the graphical user interface 270 in FIG. 2B shows that the first object 210 has a size (in this case, a diameter of a pipe) of 8 inches, and that the object does not have insulation around it (i.e., insulation thickness of 0.0 inches). Some or all of the data shown on the graphical user interface 270 (e.g., size, insulation, clearances, offsets) may be editable by the CAD system operator via the graphical user interface 270.

Consequently, step 410 may be described as providing a CAD drawing 200 referenced to a 3D coordinate system, the CAD drawing including a first element 210 representing a first physical object of a capital project, and having associated first data describing physical dimensions of the first physical object. Step 410 may also include displaying the CAD drawing 200 to the CAD system operator on the display screen 111 of the CAD system 100.

Step 420 includes learning the CAD space of the CAD drawing, for example in situations in which that CAD space is not already known to the CAD system. The CAD space of the CAD drawing 200 includes features of the CAD drawing that represent physical objects that are part of the capital project. For example, in FIG. 2B, the features of the CAD space include walls 201, 202 and floor 203, and drawing the first object 210, and their locations relative to and distances between one another in the coordinate system.

Step 430 includes receiving, by the CAD system 100 from the CAD system operator, selection of a first object 210 in the CAD drawing. Once so selected, the CAD system 100 knows, or retrieves from memory, the first data describing the physical dimensions of the first object 210.

Step 440 includes receiving, by the CAD system 100 from the CAD system operator, specification of a second object 230 to be added to the CAD drawing 200. Such and object may be referred to as a "new" object. In other embodiments, the second object may already exist in the CAD drawing 200, and may be selected by the CAD system operator so that the CAD system operator may move the second object from a first position or orientation in the CAD drawing 200 to a second position in the CAD drawing 200.

In some embodiments, receiving, by the CAD system 100 from the CAD system operator, specification of a second object includes receiving, from the CAD system operator, a point with in the coordinate system, which point will included a corresponding point on the second object. Such corresponding point may be, for example, an end of the second object, or any other point on the surface of the second object 230. After receiving selection of such a point within the coordinate system, the CAD system operator may drag the mouse away from that selected point, thereby defining a direction, within the coordinate system, for the second object to be oriented. For example, if the second object 230 is a pipe, a line between the selected point on a position of a pointer within the coordinate system indicates the direction of orientation of the second object.

Consequently, in some embodiments, step 440 may be described as receiving operator input indicating a second element to be added to the CAD drawing, the second element representing a second physical object of the capital project, and having associated second data describing physical dimensions of the second physical object.

Step 450 includes obtaining the desired clearance distance (also referred-to as "clearance") 220 between the first object 210 and the second object 230. The step of obtaining the desired clearance distance 220 between the first object 210 and the second object 230 may be performed by retrieving a previously-specified desired clearance distance from a memory 144 or database. Such previously-specified desired clearance distance may be overridden by the CAD system operator by editing the displayed value via the graphical user interface 270.

In some embodiments, the clearance distance 220 may be received from the CAD system operator via the graphical user interface 270 displayed on the CAD system's display 111. For example, the graphical user interface 270 in FIG. 2B shows several species of desired clearance, each of which may be editable by the CAD system operator via the graphical user interface.

Consequently, step 450 may be described as receiving clearance data describing a minimum distance to be maintained, in the completed capital project, between an outer surface of the first physical object and an outer surface of the second physical object.

Step 460 includes automatically generating (by the CAD system 100), and displaying on the display screen 111 of the CAD system 100, a set of visible indicators for display with the CAD drawing on the display screen 111 of the CAD system 100. The operation of step 460 (and of step 494, described below) may be described as applying a rule to the first data, second data, and clearance data 220. The rule consumes, as input, the first data, second data, and clearance data 220 and produces, as an output, the set of visual indicators. Consequently, step 460 produces the helpful set of visual indicators more quickly, easily, and more accurately than conventional methods which require careful and time-consuming calculations and CAD system manipulation by the CAD system user.

Each such visible indicator may be referred-to as a "glyph," and the set of visible indicators may be referred to as a set of glyphs. The set of visible indicators include at least one glyph, but in some embodiments the set of indicators (or set of glyphs) includes a plurality of glyphs. Examples of such embodiments are described below and schematically illustrated in figures. In illustrative embodiments, each visible indicator (each glyph) of the set of visible indicators does not represent a physical object of, or to be constructed as part of, the capital project that is the subject of the CAD drawing 200, and is not part of a grid (e.g., a "snap-to" grid) displayed by the CAD system along with the CAD drawing 200.

The position of each glyph within the coordinate system, and as displayed, visibly indicates to the CAD system operator a point at which a surface (or other cardinal point) of the second object 230 may be placed (e.g., a new second object 230 added to, or a pre-existing second object 230 moved to) such that the distance between an outer surface of the second object 230 maintains at least the desired clearance distance 220 from the outer surface of the first object.

For example, starting with FIG. 2B, the CAD drawing as displayed on the display screen 111 includes the first object 210. Pursuant to step 450, the CAD system knows the desired clearance distance 220 to be established and maintained between the first object 210 and a second object 230. Consequently, the CAD system 100 automatically generates a set of glyphs 240. In the embodiment of FIG. 2C, the set of glyphs 240 includes glyph 241, glyph 242, glyph 243, and glyph 244. Some embodiments display each glyph in the set of glyphs 240 simultaneously, and other embodiments display each glyph separately, for example according to whichever glyph from the set of glyphs 240 is closes to the location of a pointer on-screen, which location is determined by the CAD operators manipulation of the mouse 113.

Figure 4B:
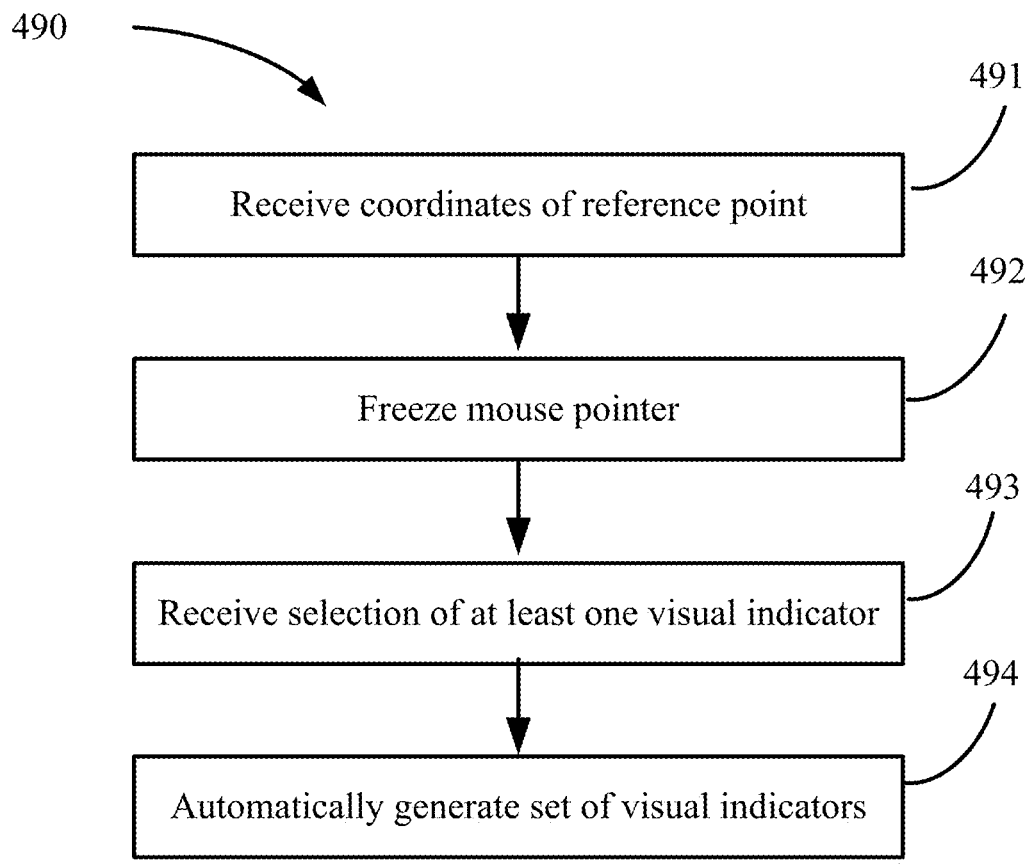
FIG. 4B is a flow chart of an embodiment of a method of generating a set of visible indicators.

In some embodiments, generating a set of visible indicators includes a process 490 according to FIG. 4B. At step 491, the CAD system 100 receives, from the CAD system operator, an input indicating the coordinates, in the coordinate system, of a reference point 211 on the first object 210. For example, such a reference point may be at the center of the first object 210, or may be a point on an axis of the first object 210. FIG. 2B schematically illustrates a reference point 211 on a pipe, the pipe being the first object 210. In some embodiments, receiving from the CAD system operator the input indicating the coordinates, in the coordinate system, of the reference point 211, may include obtaining the position of the mouse pointer 117 on the display screen 111 (which coordinates may be referred to as the "captured" pointer position).

Some embodiments freeze the location of the pointer 117 after the CAD system 100 receives the input indicating the coordinates of the reference point 211.

Some embodiments include, at step 493, receiving additional input from the CAD system operator, which additional input selects at least one of the visual indicators. In embodiments in which the pointer 117 is frozen (otherwise its movement may end up disturbing the basis reference point and hence is preferably not to be moved), the CAD system operator is unable to use the pointer 117 to provide the input selecting at least one of the visual indicators. Consequently, such embodiment receive the additional input via another (or "second") input device, the second input device being distinct from the mouse 113, such as a keyboard 112, or other device 118 such as a track ball, touch pad, or track pad, to name but a few examples.

Step 494 includes automatically generating the set of visible indicators, based on the location of the reference point 211 in the coordinate system. In some embodiments, step 494 includes generating each visible indicator of the set of visible indicators based on the location of the reference point 211 in the coordinate system, and first data, the second data, and the desired distance 220. For example, the rapid spatial positions calculator 145, being in possession of (1) the coordinates of the reference point 211 in the coordinate system, and (2) the first data [describing the physical dimensions and orientation of the first object 210, including insulation around the first object, if present], and (3) the second data [describing the physical dimensions and orientation of the second object 230, including insulation around the second object, if present], and (4) the desired distance data 220, may calculate the locations (coordinates) within the coordinate system of the outer surface of the first object, and the one or more locations (coordinates) within the coordinate system of the outer surface of the second object, each of which locations is distanced from the outer surface of the first object by the desired distance 220.

According to the foregoing, step 460 may be described as including automatically generating and displaying, over the CAD drawing on the computer display, a set of visible indicators, wherein: each visible indicator of the set of visible indicators does not represent a physical object of the capital project, and wherein each visible indicator of the set of visible indicators indicates a point within the 3D coordinate system such that placement of the second element at such visible indicator, such that the visible indicator is disposed between the first element and the second element, would satisfy the minimum distance between the first physical object and the second physical object.

Step 470 includes receiving, from the CAD system operator, selection of at least one displayed glyph. The location of a selected glyph indicates a point in the coordinate system such that placement of the second object 230 using that point would satisfy the minimum distance between the first physical object and the second physical object in the capital project.

At step 480, some embodiments then add the second object 230 to the CAD drawing 200 disposed at such selected glyph.

Figure 2D:
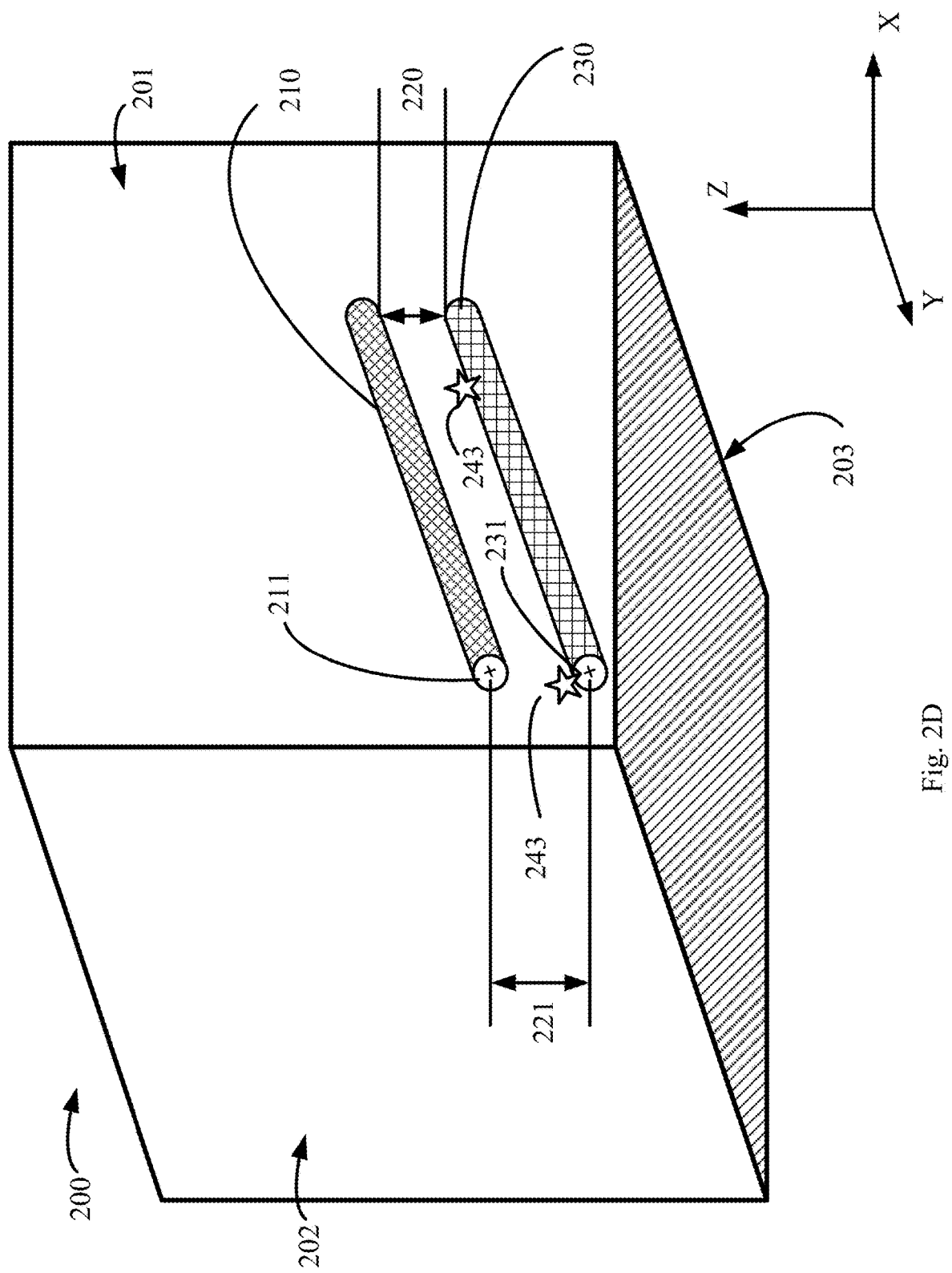
Figure 2E:
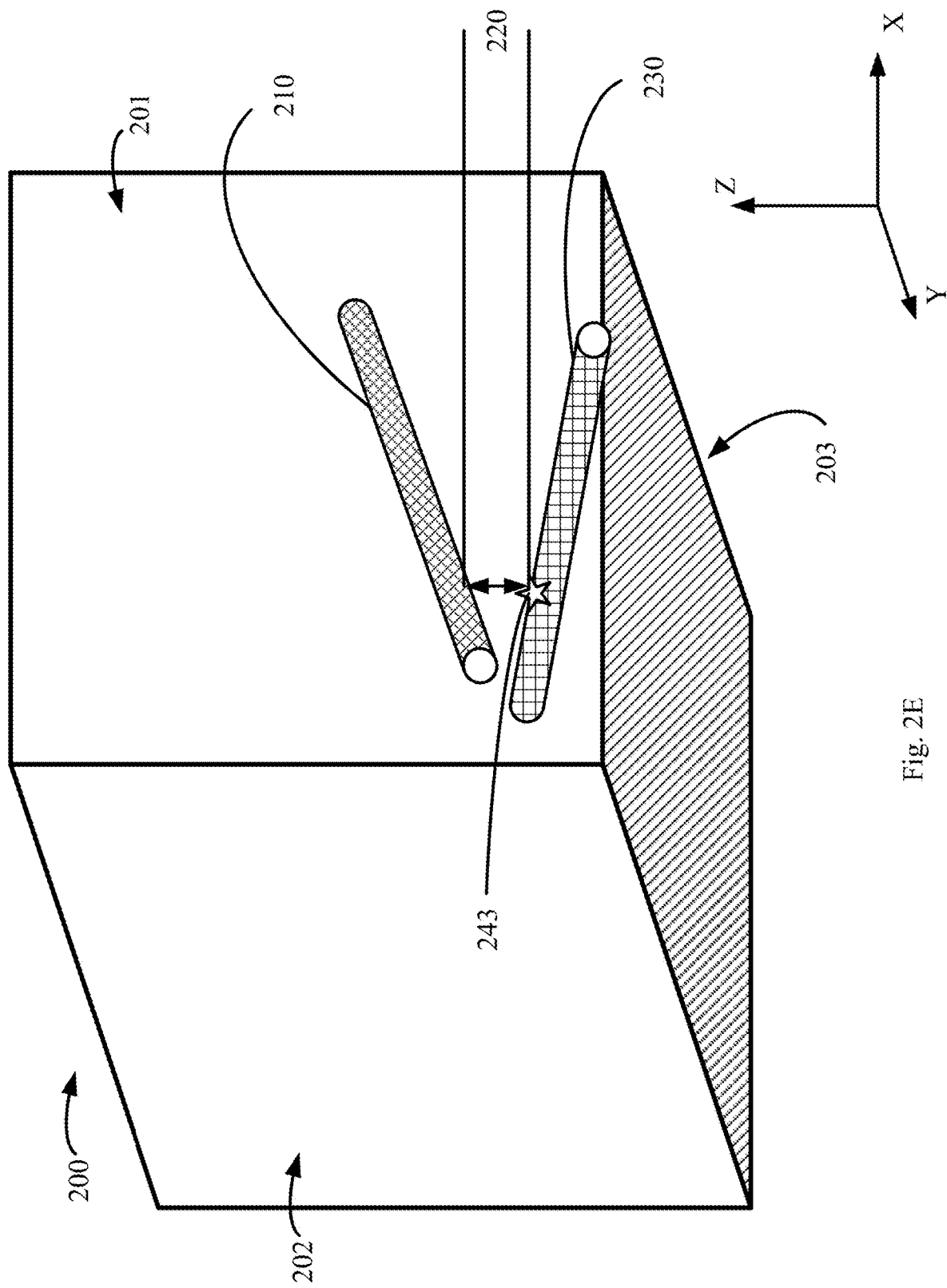

An illustrative embodiment of a second object 230 placed according to selection of a glyph is schematically illustrated in FIG. 2D. In that embodiment, the CAD systems has generated and displayed two glyphs 243. Each glyph 243 is displayed at a distance from the first object 230 such that placement of the second object 230 using the glyphs will meet the minimum clearance distance 220. In this embodiment, the CAD system operator has manipulated the second object 230 such that the surface of the second object 230 is parallel to the surface of the first object 210, and there is no point at which the distance between the surface of the second object 230 and the surface of the first object 210 is less than the desired clearance distance 220. In some embodiments, the CAD system operator may manipulate the second object 230 by, for example, selecting a first one of the displayed glyphs 243 (which may thus be referred-to as the "selected" glyph), and dragging the mouse point to the second one of the displayed glyphs 243, to indicate in some embodiments that the relevant cardinal point (bottom-s center or top-center or face-center) of the second object 230 passes through both such displayed glyphs 243, or in other embodiments where the cardinal point is the center, that the centerline of the second object 230 passes through both such displayed glyphs 243. In some embodiments, the CAD system operator may manipulate the second object 230 by, for example, causing the CAD system 100 to display the second object 230 on the CAD drawing, and then using the mouse to move the second object 230 such that in some embodiments the surface of the second object 230 passes through both such displayed glyphs 243, or in other embodiments that the centerline of the second object 230 passes through both such displayed glyphs 243.

An illustrative embodiment of a second object 230 placed according to selection of a glyph is schematically illustrated in FIG. 2E. In this embodiment, the CAD system operator has selected a displayed glyph 243 (which may thus be referred-to as the "selected" glyph), and manipulated the second object 230 so that, in some embodiments a surface of the second object 230 touches the selected glyph 243, or in other embodiments the centerline of the second object 230 lies on or passes through the selected glyph 243.

Figure 3C:
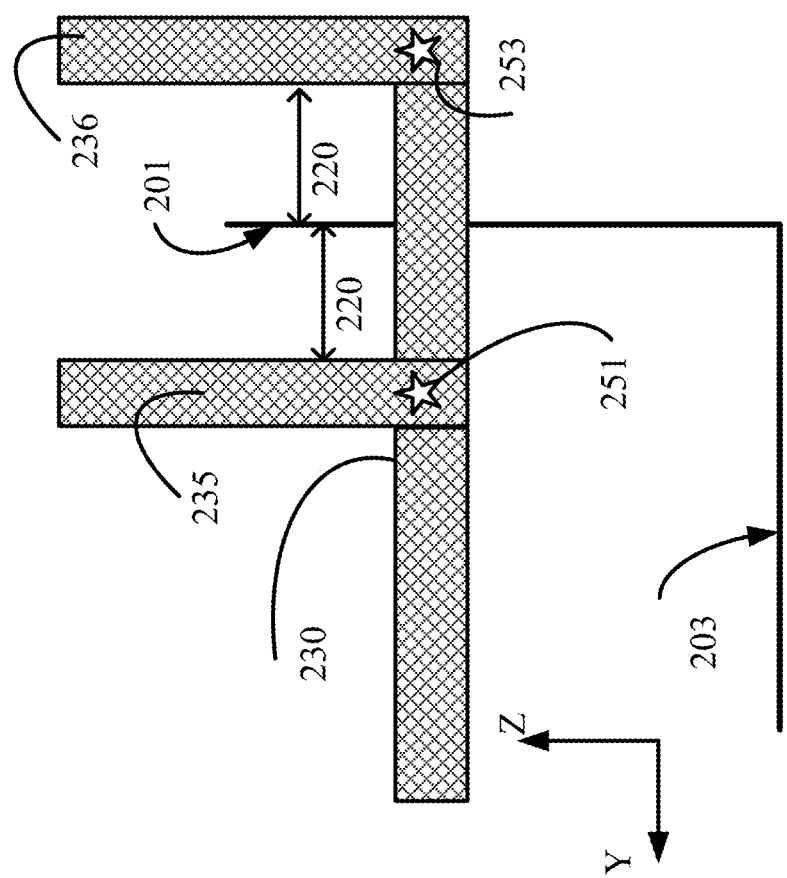

FIG. 3A, FIG. 3B and FIG. 3C schematically illustrate another embodiment, in which the first object is a surface within the CAD drawing. For example, the first object may represent a room surface being one of a wall, a floor, or a ceiling. In this illustrative embodiment of FIG. 3A, the first object is wall 201, which has a surface, and the second object is object 230.

In some circumstances, a CAD system operator may desire to place a second object near a surface (e.g., a wall, ceiling or floor), and yet maintain a minimum clearance distance between the second object. For example, a CAD system operator may desire to run a pipe (e.g., as the second object 230) towards a wall, and turn the pipe sideways, or up or down, prior to reaching the wall 201, such that the pipe maintains at least the desired clearance distance 220 from the surface of the wall 201. The CAD system operator may create or edit such a CAD drawing 200 according to the method 400 of FIG. 4A. To that end, receiving selection of the first object at step 430 includes selecting the second object 230 (step 440), and manipulating the position of the second object 230 such that the second object 230 (e.g., the longest axis of the second object) points at the first object. For example, as schematically illustrated in FIG. 3A, second object 230 has an axis represented by line 250. Line 250 intersects wall 201, and so wall 201 is the identified as the first object (step 430). In other embodiments, selecting the second object 230 may include selecting a point within the CAD drawing, which point will be in or on the second object 230, and dragging the mouse so that an on-screen pointer defines a line from that point in a direction toward the first object, e.g., wall 201. That line then intersects the first object and so identifies the first object according to step 430.

In this embodiment, step 450 includes obtaining the desired clearance distance 220 as described above. Note that the graphical user interface 270 as schematically illustrated in FIG. 2B includes displays of such distances (i.e., "Clearance to Wall," "Clearance to Ceiling," "Clearance to Floor"), which are editable by the CAD system operator via the graphical user interface 270, for example by entering an override via the Overridden Clearance space.

Step 460 then generates and displays a set of visible indicators (e.g., glyphs 251, 252 and 253. Glyph 251 indicates a point within the coordinate system at which the second object must end in order to maintain the desired clearance 220 from the surface of the first object (in this case, wall 201). That point takes into account any radius of curvature that the second object may include, to assure that the surface of the second object 230, after it turns, is at least the clearance distance from the surface of the first object. See, for example, the distance 220 between the extended portion 235 of the second object 230 and the wall 201 in FIG. 3C. Step 470 then receives a selection of the point 251 from the CAD system operator. Some embodiments then add the second object accordingly, at step 480. If the second object has a rectangular cross-section (e.g., a duct or cable tray), the position of the glyph 251 takes into account the orientation of the second object in determining the location of the glyph 251. For example, if the orientation of the cross-section is such that the longest dimension of the second portion 235 of the second object 230 will face the first object 201, then the position of the glyph will be closer to the first object than it would if the shortest dimension of the second portion 235 of the second object 230 will face the first object 201. Some embodiments display two versions of the glyph 251, one based for use if the second object is oriented in first orientation, and the second for use if the second object is oriented in a second orientation (e.g., 90 degrees from the first orientation). In other words, in scenarios where the second object has non-uniform depth and width, like a cabletray or a duct, then some embodiments of step 460 display additional glyphs which are positions for the second object to turn horizontally along the wall or vertically along the wall based on its orientation, in such a way that its outermost surface nearest to the wall or ceiling or floor after turning is at the desired clearance distance from the surface of the wall or ceiling or floor as applicable.

In another example, a CAD system operator may desire to run a pipe (e.g., as the second object 230) towards and through a wall 201, and turn the pipe sideways, or up or down, after passing through the wall 201, such that the pipe maintains at least the desired clearance distance 220 from the surface of the far side of the wall 201. The CAD system operator may create or edit such a CAD drawing 200 according to the method 400 of FIG. 4A describe above, except in this embodiment step 460 displays a set of glyphs including glyph 253 as schematically illustrated in FIG. 3A, FIG. 3B and FIG. 3C. Step 470 then receives a selection of the point 253 from the CAD system operator. Some embodiments then add the second object accordingly, at step 480.

In another example, a CAD system operator may desire to run a pipe (e.g., as the second object 230) towards and to, but not through, a wall 201. The CAD system operator may create or edit such a CAD drawing 200 according to the method 400 of FIG. 4A describe above, except in this embodiment step 460 displays a set of glyphs including glyph 252 as schematically illustrated in FIG. 3A, and FIG. 3B. Step 470 then receives a selection of the point 252 from the CAD system operator. Some embodiments then add the second object accordingly, at step 480.

In each of the foregoing examples, the method may be describes as including automatically generating a plurality of useful positions relative to the room surface 201 to facilitate routing a first portion of the second element 230 toward the room surface 201 in a first direction (e.g., normal to, or at a non-normal angle to, the room surface), and routing a second portion 235, 236 of the second element 230 in a second direction, different from the first direction, while maintaining the minimum distance 220 between the first physical object and the second physical object when construction of the first physical object and the second physical object in the capital project is complete.

A first embodiment is a computer-implemented method for adding an element to a computer-aided design drawing on a computer-aided design system having a computer display. The first embodiment includes providing a CAD drawing referenced to a 3D coordinate system. The CAD drawing includes a first element representing a first physical object of a capital project. For example, in illustrative embodiments, the first element represents a physical object to be included in a structure or apparatus to be constructed or produced. The first element has associated first data describing physical dimensions of the first physical object.

The method also includes receiving (by the CAD system) operator input indicating a second element representing a second physical object of the capital project to be added to, or modified in, the CAD drawing. The second element has associated second data describing physical dimensions of the second physical object.

The method also includes receiving (by the CAD system) operator input indicating a position or a sequence of positions to use in the placement of the second element to be added to, or modified in, the CAD drawing.

Some capital projects include requirements that are beneficially taken into account during creation or editing of the CAD drawing. For example, a capital project may include two pipes, but require that the second pipe be at least a minimum distance from the first pipe. To that end, the method also includes receiving clearance data describing a minimum distance to be maintained, in the completed capital project, between an outer surface of the first physical object and an outer surface of the second physical.

The method further includes displaying the CAD drawing on the computer display, and automatically generating and displaying, over the CAD drawing on the computer display, a set of visible indicators (or "glyphs"). In illustrative embodiments, each visible indicator of the set of visible indicators does not represent a physical object of the capital project. Instead, each visible indicator (of the set of visible indicators) indicates a point within the coordinate system such that placement of the second element at such visible indicator would—when the second physical object is placed within the physical capital project—satisfy the minimum distance between the first physical object and the second physical object.

The method also includes receiving, from an operator of the CAD system, a command to review a list of positions calculated at runtime and eventually select at least one visible indicator (may therefore be referred-to as a "selected" visible indicator), the at least one selected visible indicator representing the operator's selection of a position from a choice of positions within the 3D coordinate system for placement of the second element into the CAD drawing.

Some embodiment of the method go a step further, and include automatically placing, or modifying the second element into the CAD drawing according to the operator's selection of a position.

Various other embodiments include additional steps or details.

For example, in some embodiments, the step of displaying, on the computer display, both the CAD drawing and a set of visible indicators, includes automatically generating the set of visible indicators based on a reference point (e.g., a point on the first element, as specified by the CAD operator; the reference point may be referred-to as, and/or illustrated as, a "spider"), the first data, the second data, and the distance data. To that end, some embodiment also include receiving, from the operator, operator input indicating a reference point of the first element.

In some embodiments, displaying (over the CAD drawing on the computer display) the set of visible indicators includes displaying at least two visible indicators simultaneously. In alternative embodiments, displaying (over the CAD drawing on the computer display) the set of visible indicators includes displaying at least two visible indicators sequentially, each displayed in response to another operator input.

In terms of receiving operator input indicating a reference point of the first element, some embodiments include: obtaining the position of a mouse pointer within the 3D coordinate system (which may be referred-to as the "captured pointer position"), where the pointer position indicates a center point, or any other key point of the first element.

Some embodiments also include freezing the mouse pointer on the display at the captured pointer position. In those embodiments, the step of receiving, from the operator of the CAD system, a selection of at least one visible indicator includes receiving such operator selection via a second input device of the CAD system, said second input device being distinct from the mouse. For example, the second input device may be a keyboard; a track ball; or a touch pad or a track pad.

In some embodiments, a plurality of additional elements of the CAD drawing representing room surfaces, such as a walls, ceilings or floors, to name but a few examples, are identified in advance in the concept of learning about the room surfaces in the spatial region where design of the first or the second elements is intended. In such embodiments, the step of automatically generating and displaying a set of visible indicators (over the CAD drawing on the computer display) includes: identifying a candidate surface (for example, a wall) found in the intended direction of routing the second element; calculating a plurality of useful positions relative to the identified room surface found in the direction of the intended routing (for example, a wall or a ceiling) to facilitate routing a first portion of the second element (for example, a first portion of a pipe) toward the room surface in a first direction, and further routing a second portion of the second element (for example, a second portion of the pipe) in a second direction, different from the first direction (for example, after a bend in the pipe), while maintaining the minimum distance between the first physical object (the wall) and the second physical object (the pipe, and specifically the second portion of the pipe) when construction of the first physical object and the second physical object in the capital project is complete. As an additional example, in some embodiments, the second direction is parallel to the room surface (for example, the second portion of the pipe runs parallel to the wall in the constructed capital project).

With regard to the step of receiving clearance data, various embodiments do so in different ways. For example, in some embodiments, receiving clearance data includes receiving (or retrieving) clearance data from a memory accessible from the CAD system. In other embodiments, receiving clearance data includes receiving clearance data from the operator via a user interface of the CAD system. In some such other embodiments, such clearance data from the operator overrides clearance data from a memory accessible from (or received from or retrieved from) the CAD system.

Figure 5:
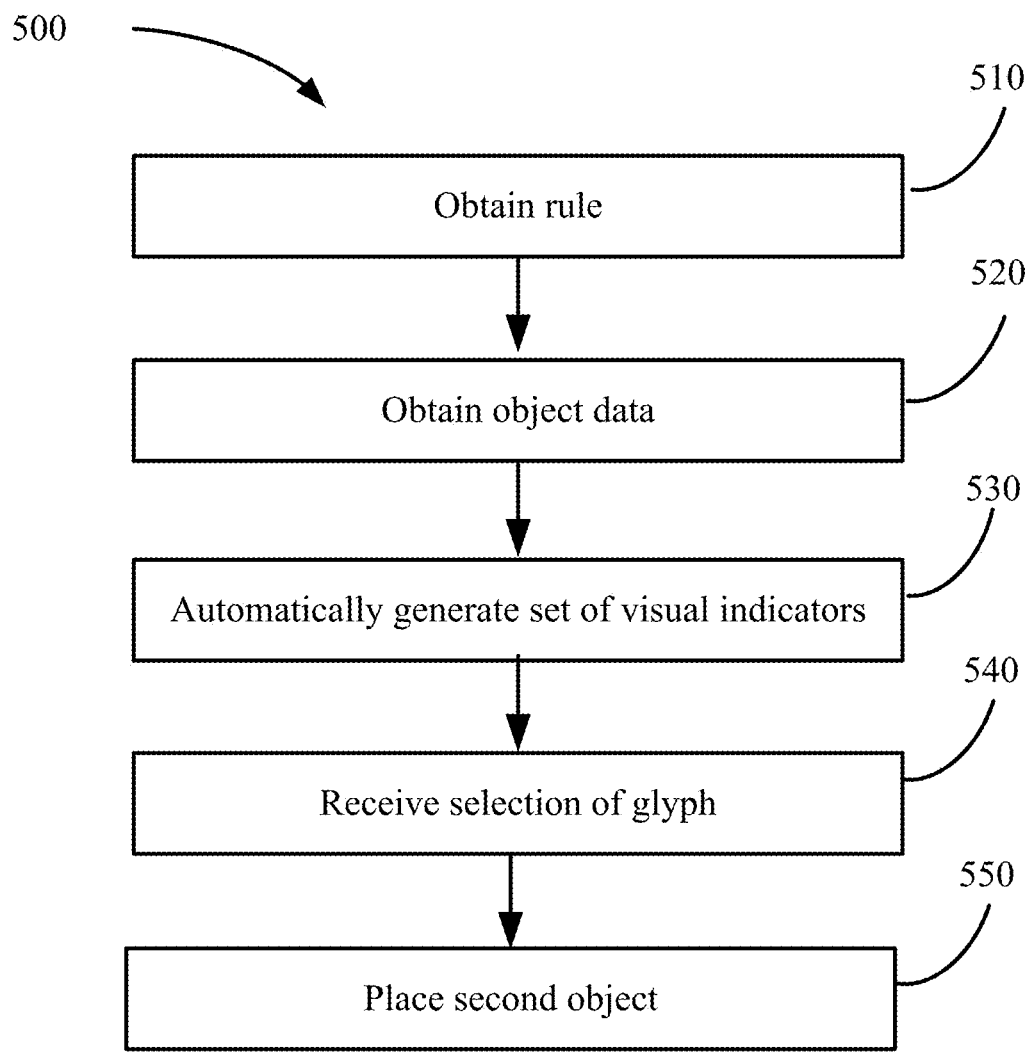
FIG. 5 is a flow chart of an embodiment of automatically determining a position for a second object in a CAD drawing.

FIG. 5 is a flow chart of an embodiment of a method 500 of automatically determining a position for a second object in a CAD drawing having a coordinate system and a pre-existing first object, where the first object and second object each represent respective physical objects in a capital project.

Step 510 includes obtaining a rule that defines a location within the coordinate system for a point on the second object, which location satisfies a minimum clearance distance from the first object.

Step 520 includes obtaining first object data describing a location in the coordinate system of an outer surface of the first object. In some embodiments, obtaining first object data describing a location in the coordinate system of an outer surface of the first object comprises obtaining first object data describing the location of the first object within the coordinate system, and describing a set of physical dimensions of the first object; and calculating the location in the coordinate system of the outer surface of the first object by deriving the location in the coordinate system of the outer surface of the first object from the location of the first object and the physical dimensions of the first object. In some embodiments, obtaining first object data describing a location in the coordinate system of an outer surface of the first object comprises receiving specification of a cardinal point 211 of the first object, and calculating the location in the coordinate system of the outer surface of the first object by deriving the location in the coordinate system of the outer surface of the first object from the location of the first object and the physical dimensions of the first object comprises determining the location of the surface of the first object by projecting the physical dimensions of the first object from the reference point. In some embodiments, step 520 includes obtaining second object data describing a set of physical dimensions of the second object.

Step 530 includes generating a set of glyphs by determining a location in the coordinate system of an outer surface of the first object and calculating a set of positions in the coordinate system, each such position being at least the minimum clearance distance from an outer surface of the first object; and displaying the set of glyphs with the CAD drawing on a display screen.

Step 540 includes receiving selection, from a CAD system operator, of a glyph (the "selected" glyph). The selected glyph specified the CAD system operator's choice of location (the "selected" location) for the second object.

Step 550 includes automatically placing the second object into the CAD drawing at the selected location.

A LISTING OF CERTAIN REFERENCE NUMBERS IS PRESENTED BELOW

100: CAD System;
110: Computer;
111: Display (or "screen" or "monitor");
112: Keyboard;
113: Mouse;
114: Left mouse button;
115: Right mouse button;
116: Mouse wheel;
117: Pointer;
118: Other input device;
121: Database;
140: System;
141: Data bus;
142: Communications interface;
143: Computer processor;
144: Computer memory;
145: Rapid Spatial Positions Calculator;
146: Display driver;

147: Input/Output interface;
200: CAD drawing of a room;
201: Back wall of room;
202: Side wall of room;
203: Floor of room
210: First object;
211: First object reference point;
220: Distance between first object and second object;
221: Distance between first object reference point and second object reference point;
230: Second object;
231: Second object reference point;
240: Indicator ring;
241-244: Indicators (or "indicator glyphs");
250: Projection line;
251-253: Projection points (or "projection glyphs");
270: Graphical user interface.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A computer-implemented method for adding an element to a computer-aided design drawing on a computer-aided design system having a computer display, comprising:
 providing a CAD drawing referenced to a 3D coordinate system, the CAD drawing including a first element representing a first physical object of a capital project, and having associated first data describing physical dimensions of the first physical object;
 receiving operator input indicating a plurality of existing elements in the CAD drawing which represent surfaces (walls, ceilings, floors) of desired rooms of the capital project relevant to the intended modeling of the CAD elements,
 receiving operator input indicating a second element to be added to the CAD drawing, the second element representing a second physical object of the capital project, and having associated second data describing physical dimensions of the second physical object;
 receiving, from an operator of the CAD system, a command selecting a reference position related to the first element, representing the operator's selection of a position within the 3D coordinate system relative to which a new position intended for placement of the second element into the CAD drawing such that the selected visible indicator is disposed between the first element and the second element.
 receiving, from an operator of the CAD system, a command selecting an intended direction of routing from a previously selected position within the 3D coordinate system, to find room surfaces in that direction;
 receiving clearance data describing a minimum distance to be maintained, in the completed capital project, between an outer surface of the first physical object and an outer surface of the second physical;
 displaying the CAD drawing on the computer display;
 automatically generating and displaying, over the CAD drawing on the computer display, a set of visible indicators, wherein:
  each visible indicator of the set of visible indicators does not represent a physical object of the capital project, and wherein
  each visible indicator of the set of visible indicators indicates a point within the 3D coordinate system such that placement of the second element at such visible indicator, such that the visible indicator is disposed between the first element and the second element, would satisfy the minimum distance between the first physical object and the second physical; and
 receiving, from an operator of the CAD system, a command selecting at least one visible indicator (each a selected visible indicator), the at least one selected visible indicator representing the operator's selection of a position within the 3D coordinate system for placement of the second element into the CAD drawing such that the selected visible indicator is disposed between the first element and the second element.

P2. The method of P1, further comprising automatically placing the second element into the CAD drawing according to the operator's selection of a position such that the selected visible indicator is disposed between the first element and the second element.

P3. The method of any of P1-P2, further comprising:
 receiving, from the operator, operator input indicating a reference point of the first element.

P4. The method of P3, wherein displaying, on the computer display, the CAD drawing and the set of visible indicators, comprises:
 automatically generating the set of visible indicators based on the reference point, the first data, the second data, and the distance data.

P5. The method of P3, wherein receiving operator input indicating a reference point of the first element comprises:
 obtaining the position of a mouse pointer within the 3D coordinate system (the captured pointer position), the pointer position indicating a center point of the first element.

P6. The method of P5, further comprising:
 freezing the mouse pointer on the display at the captured pointer position; and wherein
 receiving, from the operator of the CAD system, a selection of at least one visible indicator comprises receiving such operator selection via a second input device of the CAD system, said second input device being distinct from the mouse.

P7. The method of P6, wherein said second input device comprises one of:
 a keyboard;
 a track ball;
 a touch pad; and
 a track pad.

P8. The method of any of P1-P7, wherein displaying, over the CAD drawing on the computer display, the set of visible indicators comprises displaying at least two visible indicators simultaneously.

P9. The method of any of P1-P7, wherein displaying, over the CAD drawing on the computer display, the set of visible indicators comprises displaying at least two visible indicators sequentially, in response to third operator input.

P10. The method of any of P1-P9, wherein the first element represents a room surface comprising one of a wall, a floor, or a ceiling, and wherein automatically generating and displaying, over the CAD drawing on the computer display, a set of visible indicators comprises:
  calculating a plurality of useful positions relative to the room surface to facilitate routing a first portion of the second element toward the room surface in a first direction, and routing a second portion of the second element in a second direction, different from the first direction, while maintaining the minimum distance between the first physical object and the second physical object when construction of the first physical object and the second physical object in the capital project is complete.

P11. The method of any of P1-P10, wherein the second direction is parallel to the room surface.

P12. The method of any of P1-P11, wherein receiving clearance data comprises receiving clearance data from a memory accessible from the CAD system.

P13. The method of any of P1-P12, wherein receiving clearance data comprises receiving clearance data from the operator via a user interface of the CAD system.

P14. The method of any of P1-P13, wherein clearance data from the operator overrides clearance data from a memory accessible from the CAD system.

P21: A computer-implemented method for automatically determining a new position for a pre-existing second object in a CAD drawing having a 3D coordinate system and a pre-existing first object, where the first object and second object each represent respective physical objects in a capital project, the method comprising:
  providing a CAD drawing referenced to a 3D coordinate system, the CAD drawing including:
    the first element representing a first physical object of a capital project and having associated first data describing physical dimensions of the first physical object; and
    the second element representing a second physical object, distinct from the first physical object, of the capital project; and having associated second data describing physical dimensions of the second physical object;
  displaying the CAD drawing on a computer display;
  receiving operator input selecting the second element as an element to be moved from its initial position in the CAD drawing to a subsequent position in the CAD drawing;
  receiving specification of a minimum distance ("clearance" distance) between the first physical object and the second physical object;
  automatically generating and displaying, over the CAD drawing, on the computer display, a set of visible indicators, wherein:
    each visible indicator of the set of visible indicators does not represent a physical object of the capital project, and wherein
    each visible indicator of the set of visible indicators indicates a point within the 3D coordinate system such that placement of the second element at such visible indicator, such that the visible indicator is disposed between the first element and the second element, would satisfy the minimum distance between the first physical object and the second physical object; and
  receiving, from an operator of the CAD system, a command selecting at least one visible indicator (each a selected visible indicator), the at least one selected visible indicator representing the operator's selection of a position (the "selected" position) within the 3D coordinate system for placement of the second element into the CAD drawing such that the selected visible indicator is disposed between the first element and the second element.

P22: A computer-implemented of P21, further comprising automatically placing the second object in the CAD drawing at the selected position.

P31: A computer-implemented method for automatically determining a position for a second object in a CAD drawing having a coordinate system and a pre-existing first object, where the first object and second object each represent respective physical objects in a capital project, the method comprising:
  obtaining a rule that defines a location within the coordinate system for a point on the second object, which location satisfies a minimum clearance distance from the first object;
  obtaining first object data describing a location in the coordinate system of an outer surface of the first object;
  generating a set of glyphs by determining a location in the coordinate system of an outer surface of the first object and calculating a set of positions in the coordinate system, each such position being at least the minimum clearance distance from an outer surface of the first object; and displaying the set of glyphs with the CAD drawing on a display screen.

P32. The method of P31 further comprising:
obtaining second object data describing a set of physical dimensions of the second object.

P33. The method of any of P31-P32, further comprising:
receiving, from the CAD system operator, selection of a one of the displayed glyphs (the "selected" glyph);
calculating a point on an outer surface of the second object; and
automatically placing the second object into the CAD drawing at the selected glyph such that a surface of the second object is at the location of the selected glyph and the second object is at least the minimum clearance distance from the outer surface of the first object.

P34. The method of any of P31-P33, wherein:
obtaining first object data describing a location in the coordinate system of an outer surface of the first object comprises obtaining first object data describing the location of the first object within the coordinate system, and describing a set of physical dimensions of the first object; and
calculating the location in the coordinate system of the outer surface of the first object by deriving the location in the coordinate system of the outer surface of the first object from the location of the first object and the physical dimensions of the first object.

P35. The method of any of P31-P34 wherein obtaining first object data describing a location in the coordinate system of an outer surface of the first object comprises receiving specification of a reference point of the first object, and calculating the location in the coordinate system of the outer surface of the first object by deriving the location in the coordinate system of the outer surface of the first object from the location of the first object and the physical dimensions of the first object comprises determining the location of the surface of the first object by projecting the physical dimensions of the first object from the reference point.

P41: A computer-implemented system configured to implement any of the methods of P1-P14, P21, P22 and P31-P35.

P51: A computer program product having non-volatile computer instructions stored thereon, which non-volatile computer instructions, when executed by a computer processor of a CAD system, cause the CAD system to perform a method according to any of P1-P14, P21, P22 and P31-P35.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP, or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A computer-implemented method for adding an element to a computer-aided design drawing on a computer-aided design ("CAD") system having a computer display, comprising:
   providing a CAD drawing referenced to a 3D coordinate system, the CAD drawing including a first element representing a first physical object of a capital project, and having associated first data describing physical dimensions of the first physical object;
   receiving operator input indicating a second element to be added to the CAD drawing, the second element representing a second physical object of the capital project, and having associated second data describing physical dimensions of the second physical object;
   receiving clearance data describing a minimum distance to be maintained, in the completed capital project, between the first physical object and the second physical object;
   displaying the CAD drawing on the computer display;
   calculating a plurality of potential positions for the second element within the 3D coordinate system based on the clearance data, wherein for each calculated potential position, there is a shortest distance between the first element and the second element, the shortest distance corresponding to the minimum distance;
   automatically generating and simultaneously displaying, for each of the plurality of potential positions, over the CAD drawing on the computer display, one visible indicator of a set of visible indicators, wherein:
      each visible indicator of the set of visible indicators does not represent a physical object of the capital project, and
      each visible indicator of the set of visible indicators is selectable and corresponds to one of the plurality of potential positions for the second element;
   receiving, from an operator of the CAD system, a command selecting a first visible indicator of the set of visible indicators, the first visible indicator corresponding to a first potential position of the plurality of potential positions; and
   placing the second element at the first potential position in response to receiving the command selecting the first visible indicator.

2. The method of claim 1, further comprising automatically placing the second element into the CAD drawing according to the operator's selection.

3. The method of claim 1, further comprising:
   receiving, from the operator, operator input indicating a reference point of the first element.

4. The method of claim 3, wherein displaying, on the computer display, the CAD drawing and the set of visible indicators, comprises:
   automatically generating the set of visible indicators based on the reference point, the first data, the second data, and the distance data.

5. The method of claim 3, wherein receiving operator input indicating the reference point of the first element comprises:
   obtaining a position of a mouse pointer within the 3D coordinate system (the captured pointer position), the pointer position indicating a center point of the first element.

6. The method of claim 5, further comprising:
   freezing the mouse pointer on the display at the captured pointer position; and wherein
   receiving, from the operator of the CAD system, the command selecting the first visible indicator comprises receiving the command via a second input device of the CAD system, said second input device being distinct from the mouse.

7. The method of claim 6, wherein said second input device comprises one of:
a keyboard;
a trackball;
a touch pad;
a joystick; or
a track pad.

8. The method of claim 1, wherein displaying, over the CAD drawing on the computer display, the set of visible indicators comprises displaying at least two visible indicators simultaneously.

9. The method of claim 1, wherein displaying, over the CAD drawing on the computer display, the set of visible indicators comprises displaying at least two visible indicators sequentially, in response to third operator input.

10. The method of claim 1, wherein:
the first element represents a room surface comprising one of a wall, a floor, or a ceiling, and
calculating the plurality of potential positions includes calculating the plurality of potential positions relative to the room surface to facilitate routing a first portion of the second element toward the room surface in a first direction, and routing a second portion of the second element in a second direction, different from the first direction, while maintaining the minimum distance between the first physical object and the second physical object when construction of the first physical object and the second physical object in the capital project is complete.

11. The method of claim 10, wherein the second direction is parallel to the room surface.

12. The method of claim 10, wherein receiving clearance data comprises receiving clearance data from a memory accessible from the CAD system.

13. The method of claim 10, wherein receiving clearance data comprises receiving clearance data from the operator via a user interface of the CAD system.

14. The method of claim 10, wherein clearance data from the operator overrides clearance data from a memory accessible from the CAD system.

15. A computer-aided design ("CAD") system comprising:
a computer processor, an input device, and a display configured to display a CAD drawing to a system operator for editing;
a memory coupled to the processor, the memory holding instruction which, when executed by the computer processor, cause the CAD system to perform a method comprising:
providing a CAD drawing referenced to a 3D coordinate system, the CAD drawing including a first element representing a first physical object of a capital project, and having associated first data describing physical dimensions of the first physical object;
receiving operator input indicating a second element to be added to the CAD drawing, the second element representing a second physical object of the capital project, and having associated second data describing physical dimensions of the second physical object;
receiving clearance data describing a minimum distance to be maintained, in the completed capital project, between the first physical object and the second physical object;
displaying the CAD drawing on the computer display;
calculating a plurality of potential positions for the second element within the 3D coordinate system based on the clearance data, wherein for each calculated potential position, there is a shortest distance between the first element and the second element, the shortest distance corresponding to the minimum distance;
automatically generating and simultaneously displaying, for each of the plurality of potential positions, over the CAD drawing on the computer display, one visible indicator of a set of visible indicators, wherein:
each visible indicator of the set of visible indicators does not represent a physical object of the capital project, and
each visible indicator of the set of visible indicators is selectable and corresponds to one of the plurality of potential positions for the second element;
receiving, from an operator of the CAD system, a command selecting a first visible indicator of the set of visible indicators, the first visible indicator corresponding to a first potential position of the plurality of potential positions; and
placing the second element at the first potential position in response to receiving the command selecting the first visible indicator.

16. The system of claim 15, wherein:
the first element represents a room surface comprising one of a wall, a floor, or a ceiling, and
calculating the plurality of potential positions includes calculating the plurality of potential positions relative to the room surface to facilitate routing a first portion of the second element toward the room surface in a first direction, and routing a second portion of the second element in a second direction, different from the first direction, while maintaining the minimum distance between the first physical object and the second physical object when construction of the first physical object and the second physical object in the capital project is complete.

17. The system of claim 15, wherein receiving clearance data comprises receiving clearance data from the operator via a user interface of the CAD system.

18. A computer program product having non-volatile computer instructions stored thereon, which non-volatile computer instructions, when executed by a computer processor of a computer-aided design ("CAD") system, cause the CAD system to perform a method comprising:
providing a CAD drawing referenced to a 3D coordinate system, the CAD drawing including a first element representing a first physical object of a capital project;
receiving operator input indicating a second element to be added to the CAD drawing, the second element representing a second physical object of the capital project, and having associated second data describing physical dimensions of the second physical object;
receiving clearance data describing a minimum distance to be maintained, in the completed capital project, between the first physical object and the second physical object;
displaying the CAD drawing on the computer display;
calculating a plurality of potential positions for the second element within the 3D coordinate system based on the clearance data, wherein for each calculated potential position, there is a shortest distance between the first element and the second element, the shortest distance corresponding to the minimum distance;
automatically generating and simultaneously displaying, for each of the plurality of potential positions, over the CAD drawing on the computer display, one visible indicator of a set of visible indicators, wherein:

each visible indicator of the set of visible indicators does not represent a physical object of the capital project, and each visible indicator of the set of visible indicators is selectable and corresponds to one of the plurality of potential positions for the second element;

receiving, from an operator of the CAD system, a command selecting a first visible indicator of the set of visible indicators, the first visible indicator corresponding to a first potential position of the plurality of potential positions; and placing the second element at the first potential position in response to receiving the command selecting the first visible indicator.

19. The computer program product of claim 18, wherein:
the first element represents a room surface comprising one of a wall, a floor, or a ceiling, and calculating the plurality of potential positions includes calculating the plurality of potential positions relative to the room surface to facilitate routing a first portion of the second element toward the room surface in a first direction, and routing a second portion of the second element in a second direction, different from the first direction, while maintaining the minimum distance between the first physical object and the second physical object when construction of the first physical object and the second physical object in the capital project is complete.

20. The computer program product of claim 18, wherein receiving clearance data comprises receiving clearance data from the operator via a user interface of the CAD system.

* * * * *